(12) United States Patent
Slater

(10) Patent No.: US 7,315,805 B2
(45) Date of Patent: Jan. 1, 2008

(54) OPERATIONS AND SUPPORT DISCRETE EVENT STIMULATION SYSTEM AND METHOD

(75) Inventor: Robert D Slater, Tucson, AZ (US)

(73) Assignee: Raytheon Company, Waltham, MA (US)

(*) Notice: Subject to any disclaimer, the term of this patent is extended or adjusted under 35 U.S.C. 154(b) by 672 days.

(21) Appl. No.: 10/772,592

(22) Filed: Feb. 5, 2004

(65) Prior Publication Data
US 2005/0177353 A1 Aug. 11, 2005

(51) Int. Cl.
G06F 17/50 (2006.01)
B64D 1/04 (2006.01)
F41F 5/00 (2006.01)
F41G 5/06 (2006.01)
F41G 5/08 (2006.01)

(52) U.S. Cl. .............. 703/19; 89/1.11; 89/41.07; 702/144

(58) Field of Classification Search ............ 703/19; 702/144
See application file for complete search history.

(56) References Cited

U.S. PATENT DOCUMENTS

| 4,901,260 A | 2/1990 | Lubachevsky |
| 4,965,743 A | 10/1990 | Malin |
| 5,247,650 A | 9/1993 | Judd et al. |
| 5,617,342 A | 4/1997 | Elazouni |
| 5,701,439 A | 12/1997 | James |
| 5,794,005 A | 8/1998 | Steinman |
| 5,801,938 A | 9/1998 | Kalantery |
| 5,828,867 A | 10/1998 | Pennell |
| 6,324,495 B1 | 11/2001 | Steinman |
| 6,497,169 B1 * | 12/2002 | Khosla ............ 89/1.11 |

OTHER PUBLICATIONS

Upadhya et al. 'A Simulation Model for Availability Under Battlefield Situations' 2000.*
Srinivasan et al. 'Availability of Weapons Systems with Logistic Delays: A Simulation Approach' 2003.*
Schwartz, Nina. 'Exoatmospheric Kill Vehicle' 2000.*

* cited by examiner

Primary Examiner—Kamini Shah
Assistant Examiner—Shambhavi Patel
(74) Attorney, Agent, or Firm—Noblitt & Gilmore, LLC

(57) ABSTRACT

A discrete event simulation (DES) and method of model development provide affordable, accurate, pre-validated, reusable and portable models and simulations that capture the complexity, interdependencies and stochastic nature of the operations and support (O&S) of weapons systems. A model of the O&S problem is created based on a service use profile (SUP) that describes a logical structure of delivery, maintenance, deployment, testing policy, infrastructure and logistics constraints. That model is translated into a DES, preferably using a "toolkit" including common attributes for the weapons and pre-validated common blocks and submodels that define higher level functionality. The DES calculates a time-based prediction of weapons availability, maintenance activities, and spare parts stock over a life cycle of the weapons system.

61 Claims, 28 Drawing Sheets

| ATTRIBUTE (m=multiple) | PURPOSE |
|---|---|
| Birth Date 82 | Stores times at which Hardware first enters the O&S process. |
| TTF Variate (m) 84 | Stores time at which hardware will fail. Randomly determined. Multiple attributes for multiple environments. These are set/reset whenever hardware is issued/reissued. |
| Duty Cycle (m) 86 | Accumulators for time or cycles spent in various states/environments. These are reset to zero whenever hardware is reissued. |
| Warranty Cycle (m) 88 | Accumulators for time or cycles spent in various states/environments. These are never reset. |
| Down Time 90 | Accumulator for time spent while hardware is not RFI. |
| MTBF Variate (m) 92 | Stores Mean Time Between Failure for specific enviornments. These can change over time to approximate reliability growth or hardware degradation over time. |
| BitDetectable 94 | Randomly generated flag to indicate if a test will be effective at detecting a failure in the weapon hardware. |
| Weapon Variant (m) 96 | Marks the dynamic object as being a particular type of weapon. |
| GodsEye 97 | Marks the dynamic object that is in a failed state as being failed, if the dynamic object has a failure not detectable by field BIT. |

Fig. 3

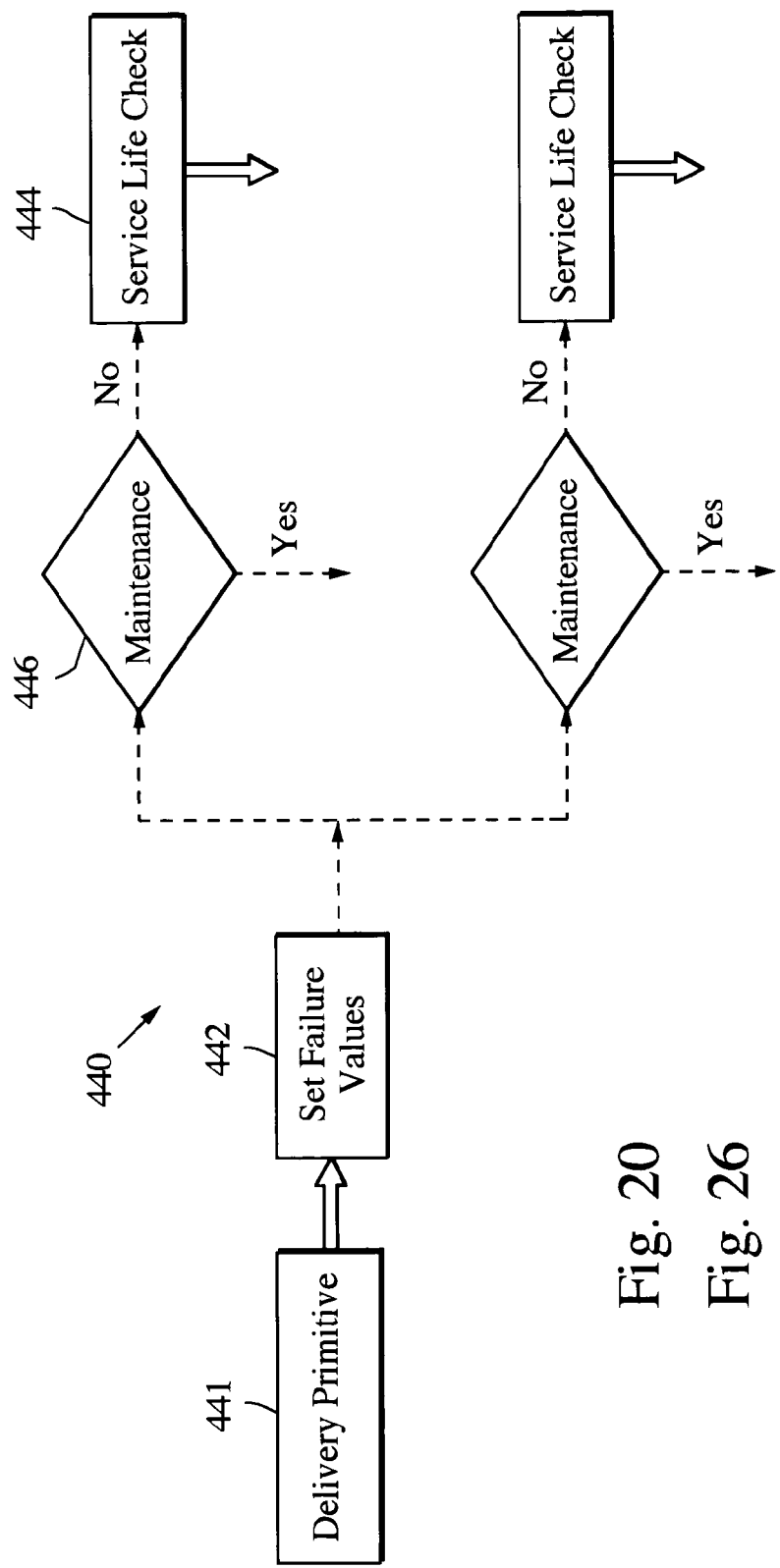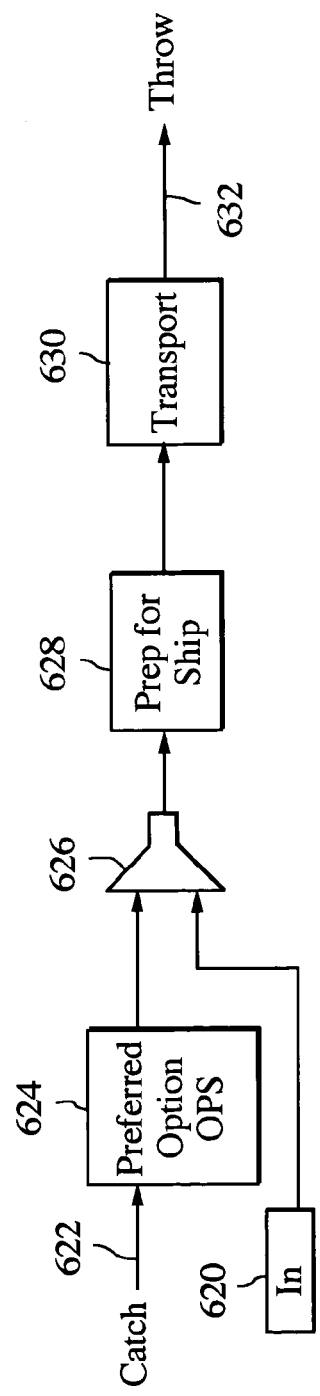
Fig. 20
Fig. 26

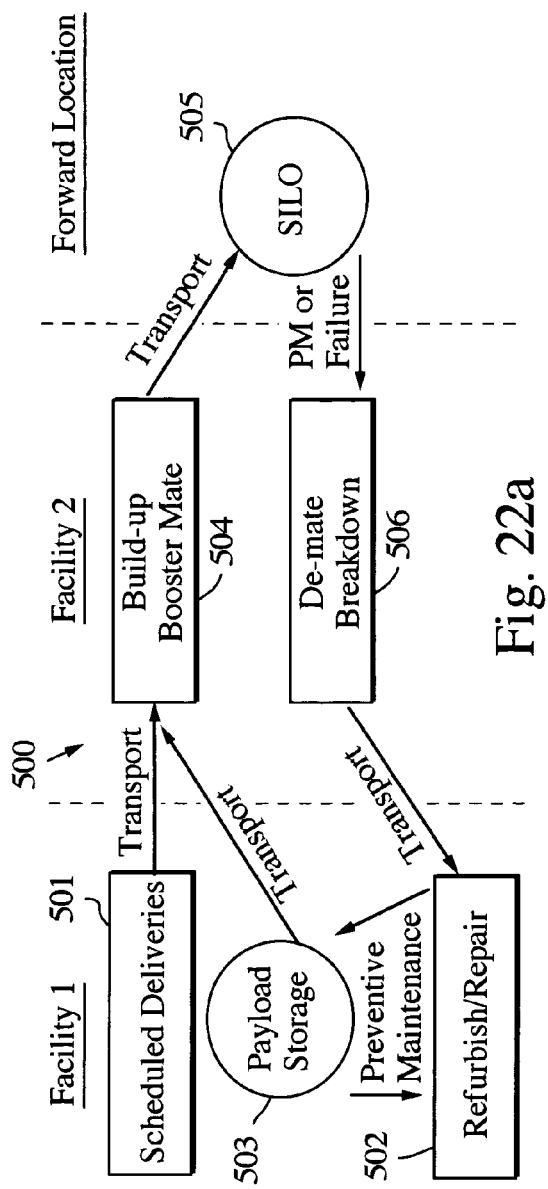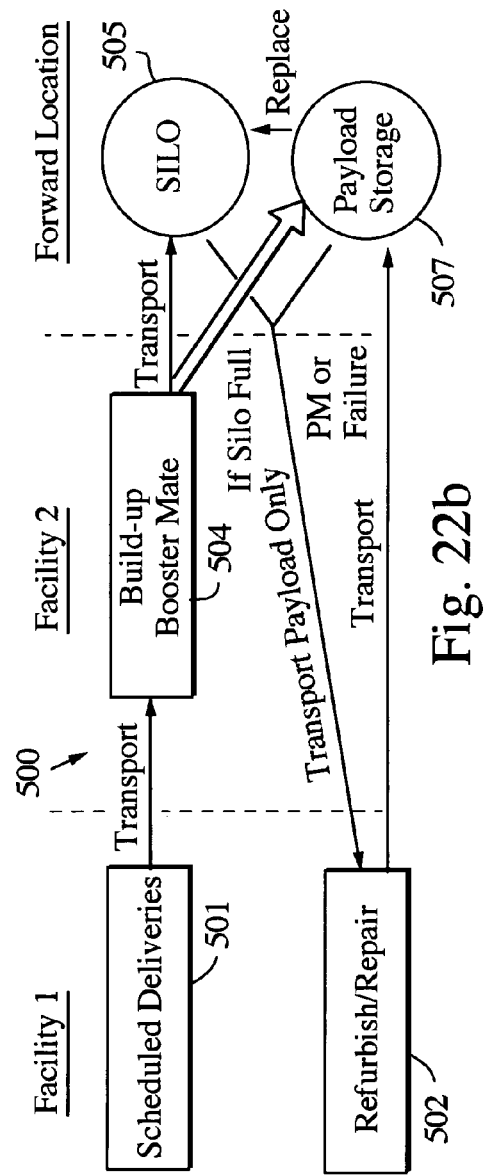
Fig. 22a
Fig. 22b

OPERATIONS AND SUPPORT DISCRETE EVENT STIMULATION SYSTEM AND METHOD

BACKGROUND OF THE INVENTION

1. Field of the Invention

This invention relates to a discrete event simulation and method of model development for operations and support of weapons systems and more specifically to the creation and use of common attributes and a library of common blocks and sub-models to model a service use profile (SUP).

2. Description of the Related Art

There is ongoing need to affordably sustain levels of readiness for existing weapon systems, and to design new weapon systems that can be affordably sustained over a specified life-cycle. It follows that there are analytical needs for existing and future fielded weapon systems, which account for operations and support policies, weapon reliability, maintenance concept (maintenance location, weapon spares, spare weapon components, test equipment, and support equipment) and support infrastructure. These factors have combined consequences on the effectiveness of the weapon system by directly impacting the operational and stockpile availability of the population and the reliability of weapons at the time they are required for actual use.

A thorough analysis should account for: exposure of sub-populations to different environments and the resultant effect on their reliability in differing environments; possible improvements and/or degradation in inherent reliability over time; effectiveness and reliability of the test equipment; tracking multiple variants of weapons with differing reliability characteristics or maintenance procedures through the support system; the possibility of weapon inventories being taxed through multiple global engagements, and determining effects of retrofit or recall programs; the possibility of future retrofit requiring recall of all or a portion of the inventory; and the increasing complexities of weapon systems leading to more complicated field build-up, storage, maintenance, testing, and deployment procedures. The analysis that integrates the above factors should provide: expected quantity and likely time of repairs from the field; operational and stockpile availability estimates; prediction of reliability requirement of weapon hardware; prediction of maintainability characteristics for weapon hardware (e.g., hardware accessibility & modularity); spare weapon and spare parts requirements at repair locations; and flow volumes of weapons and weapon parts through logistics pipeline infrastructure (prediction of the quantity of any cost-incurring event of interest).

Within the defense industry and government labs, weapon support systems are typically modeled with whatever tools and expertise are at hand at the time the model is needed. This can lead to inconsistencies between studies. Also the problem is often broken up for simplicity. For example, a fielded spares analysis may be done independently of an availability analysis. This piecemeal approach can lead to inconsistency and inaccuracies as different ground rules and assumptions can be used between the models. Even if careful consideration was given to using consistent ground rules, the assumptions for bridging information between modeled components of a larger system can oversimplify the effect of complex interdependencies of those components within the larger system.

It is also not uncommon within industry and government, even among some technical experts and engineers, to over-simplify the problem. For estimating future maintenance loads over a weapon program's life-cycle, for example, it is often thought that a reasonable estimate of non-operational reliability is the most significant factor. Although important, non-operational reliability is often not the most significant factor. Consider this: Given an inventory of 1000 stored weapons, each with storage MTBF of 1,000,000 hours ($10^6$ hrs), if after 5 years (43,800 hrs) all are tested, the number of repairs will be $1,000*(43,800/10^6)=44$ weapons. However, if policy establishes that entire inventory is to be tested 200 at a time, every year (8,760 hrs) for five years, the number of repairs will be for $\Sigma_{n-1 \, to \, 5} \, 200*(n*8,760/10^6)=26$ weapons.

Grossly over-simplistic by not accounting for any complicating factors mentioned previously, this example shows how just one aspect, test policy, can greatly influence the maintenance load outcome. Also, revisiting the point made earlier about interdependencies, fewer failures detected affects other aspects of the system, such as population availability, logistics pipeline throughput (effecting transportation and other infrastructure), and the reliability of a weapon up to the point of actual use. The one change in test policy has a domino affect on many aspects of the system. Clearly, an integrated approach should be taken when analyzing an Operations and Support system.

If the problem is attacked as a whole system, tools traditionally used include spreadsheets or conventional computer programs. Mechanized arrays of equations implemented on a computer, otherwise known as spreadsheets, can easily oversimplify by either not modeling enough detail within support process (detail that can have unexpected impact on the output of the model), not capturing the dynamic aspects (e.g., surges in inventory demand), or not capturing the stochastic nature of the problem. If built to accommodate all pertinent detail, dynamic, and probabilistic aspects of the system, the spreadsheet model will likely be very large and complicated, so as to be unwieldy, hard to use, difficult to modify and difficult for others to use.

There exists a need for effectively and holistically modeling and analyzing life cycle operations and support of missile and missile defense systems capturing the complexity, interdependencies, and random nature of the problem. Any approach should affordably provide accurate, reusable and portable models for analyzing the problem.

SUMMARY OF THE INVENTION

The present invention provides a discrete event simulation (DES) and method of model development for DES useful for affordably providing accurate, reusable and portable models for analyzing the service use profile (SUP) of missile and missile defense systems. This is a repeatable and reliable statistical-based method for integrating interdependent elements of the SUP in the development of comprehensive simulation models to support multiple types of analyses. These models provide data useful for assisting decision makers to sustain and maintain an operationally effective inventory of weapons over the product life-cycle. Common output from the models are time-based prediction of maintenance activities (warranted or non-warranted), prediction of stockpile and operational availability, logistics support requirements, weapon spares and weapon-part spares requirements.

This is accomplished by first creating a model of the O&S problem based on a service use profile (SUP) that describes a logical structure of delivery, maintenance, deployment and testing policy and infrastructure and logistics constraints. The model is translated into a discrete event simulation in which dynamic objects (weapons) flow through a network of static objects that are organized in accordance with the model. The static objects are defined by data that is global with respect to the dynamic objects and functional operators at least some of which are probabilistic. Decisions are made based on the local state of a dynamic object or a global state of the network at least some of which are randomized in occurrence and/or time duration by the functional operators. Each dynamic object includes common attributes with unique deterministic or random values at least some of which are updated as the dynamic object flows through the network and decisions are made. The simulation outputs a time-based prediction of weapons availability, maintenance activities, and spare parts stock over a life cycle of the weapons system.

The DES and method of model development are enhanced by further defining common attributes for the dynamic objects and providing a library of common blocks and sub-models that support typical SUPs. The dynamic objects have any number of attributes that characterize the weapon. Among them are common attributes including Birth Date, TTF Variate, Duty Cycle, Warranty Cycle, Down Time, MTBF Variate, BitDetectable, GodsEye, and Weapon Variant. Certain attributes are dependent on environment and/or time. The common blocks represent fundamental and widely used calculations based on defined combinations of two or more simulation primitives or other embedded common blocks. Among them are BIT, Stockpile Availability, Observe $A_o$, Operational Availability, Warranty Check, Set Failure Variates, Service Life Check and Parts Spares. The sub-models are synergistic combinations of common attributes and common blocks that represent an even higher level of functionality. Among them are Test Effectiveness, Operational Availability, Reliability Growth and Degradation and Predict Repair Maintenance. The common attributes, common blocks and sub-models create a standardized and hierarchical toolkit for modeling a missile or missile defense system and designing a discrete event simulation that is tailored to the unique operations and support problem. The use and reuse of the tools by different designers on different projects will improve the consistency, accuracy and confidence in the simulation results. Furthermore, the toolkit will make construction of weapon system simulation models more cost effective.

In one embodiment, discrete event simulation is used to model the availability of Exoatmospheric Kill Vehicles (EKVs) to (1) decide between two competing maintenance concepts A and B for the program, concepts that differ dramatically in cost; (2) quantify repairs of EKV payloads; and (3) identify major spares requirements for EKV payloads return. The EKV is organized into three high level hierarchical blocks (H blocks): (1) Delivery, Repair & Deployment; (2) Silo Storage and Periodic Test; and (3) Maintenance Returns. These blocks are built and interact using the common attributes and common blocks.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a table of common attributes for dynamic objects;

FIG. 20 is a block diagram of a Reliability Growth and Degradation sub-model;

FIGS. 22a and 22b are block diagrams of alternate maintenance concepts for an EKV model;

FIG. 26 is a detailed flow diagram of the Operations & Maintenance Returns H-block.

DETAILED DESCRIPTION OF THE INVENTION

A discrete event simulation (DES) and method of model development provide affordable, accurate, pre-validated, reusable and portable models and simulations that capture the complexity, interdependencies and stochastic nature of the operations and support (O&S) of missile and missile defense weapons systems. A model of the O&S problem is created based on a service use profile (SUP) that describes a logical structure of delivery, maintenance, deployment, testing policy, infrastructure and logistics constraints. That model is translated into a DES, preferably using a "toolkit" including common attributes for the weapons and pre-validated common blocks and sub-models that define higher level functionality. The DES calculates a time-based prediction of weapons availability, maintenance activities, and spare parts stock over a life cycle of the weapons system.

DES algorithms were originally developed in the 1950s but have only found widespread use in the last decade with the advancement of portable computer technology and simulation software such as Extend. DES has been used to analyze manufacturing scenarios, traffic, computer and satellite networks, material handling, supply chains and business process re-engineering, often to investigate and help alleviate system congestion, queuing or "bottlenecking" from high volumes.

DES for Missile and Missile Defense Systems

Figure 1A:
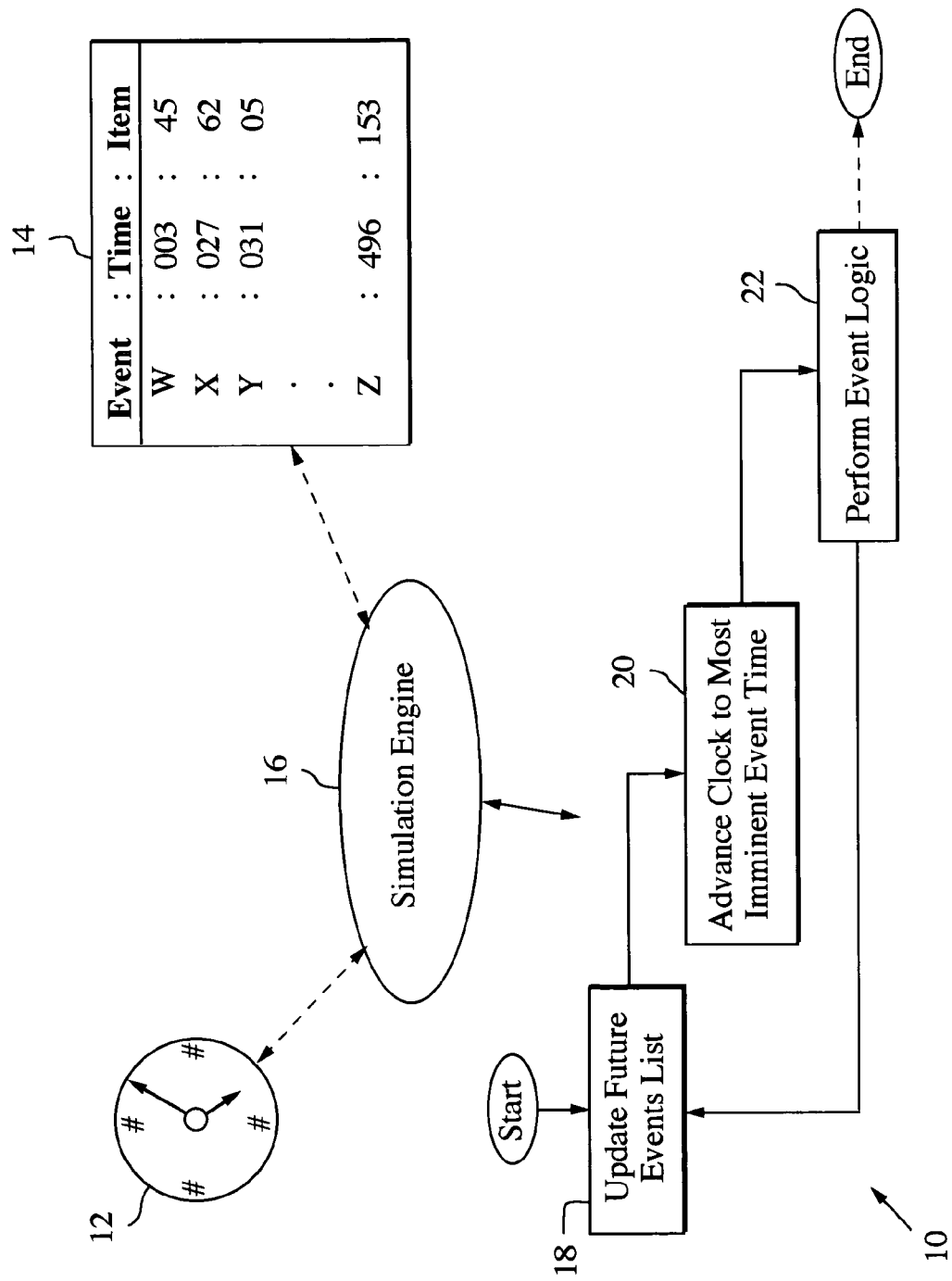
FIGS. 1a through 1c are block diagrams of a Discrete Event Simulation of a missile or missile defense weapons system in accordance with the present invention.

As shown in FIG. 1a, a DES 10 is a representation of a system that partitions the timeline of the system into a sequence of asynchronous state changes. Each state change is referred to as an "event". In a DES, there is a global system clock 12 and future event schedule 14 that lists events ranked from earliest to latest along the timeline. During DES execution, at each event instance, a simulation engine 16 updates the future events schedule 14 (step 18) with new future event(s) whose times of occurrence can be deterministically or randomly determined, advances the clock to the most imminent event time (step 20) and performs the event logic (step 22). The sequence of state changes execute a model based on a service use profile (SUP) that describes a logical structure of delivery, maintenance, deployment and testing policy and infrastructure and logistics constraints to calculate a time-based prediction of weapons availability, maintenance activities, and spare parts stock over a life cycle of the weapons system.

Figure 1B:
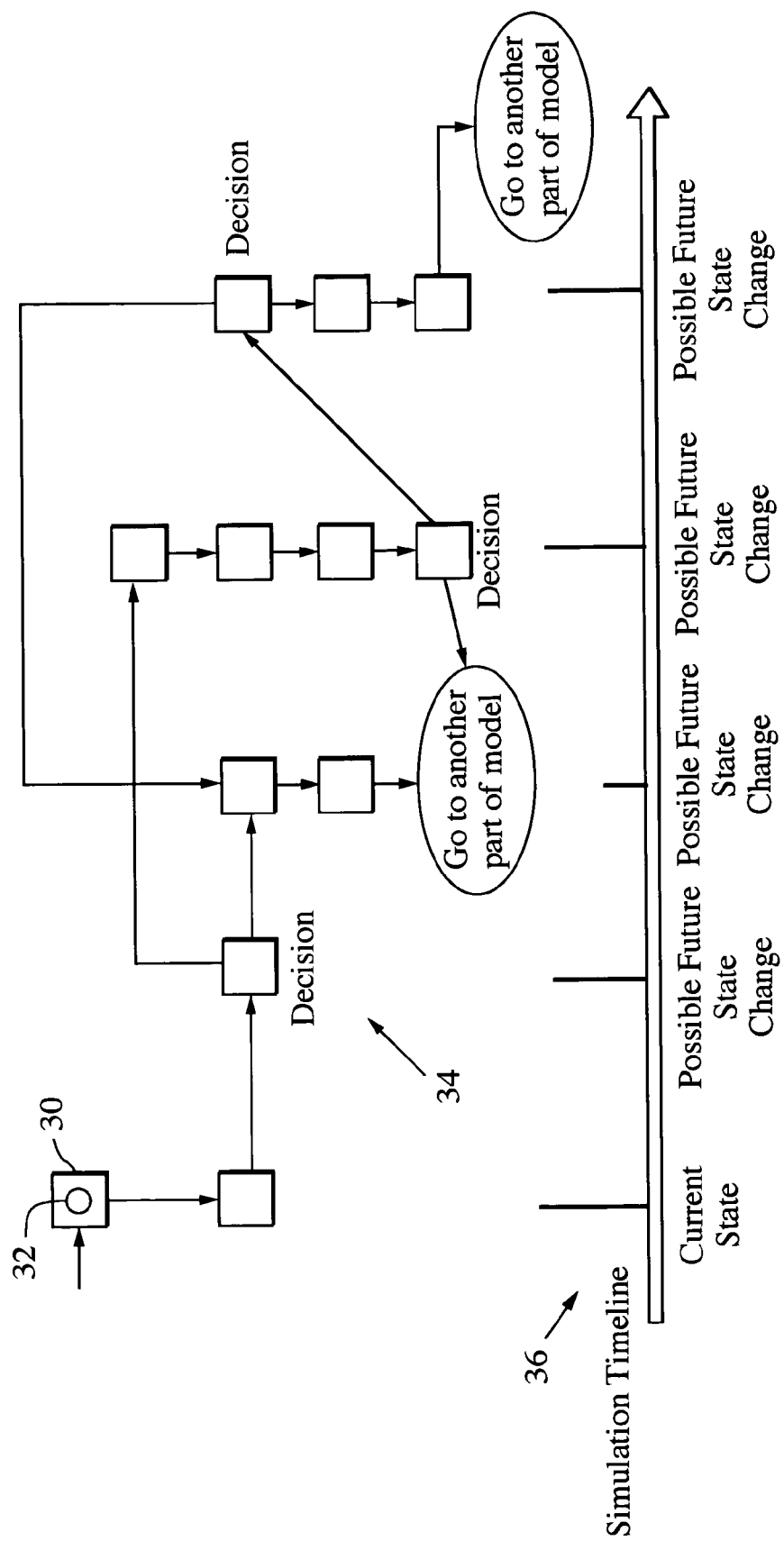

As shown in FIG. 1b, another element of the DES algorithm is a class of structured objects. Objects may be static objects (SOs) 30 (permanent and predefined) or dynamic objects (DOs) 32 (created and destroyed as needed). The static objects 30 include data that is global with respect to the dynamic objects and functional operators, at least some of which are probabilistic. The dynamic objects 34 include attributes that are local and represent characteristics of weapons. Static objects can be generally thought of as building blocks that form a network 34 over which the dynamic objects traverse. The network describes the logical structure of the logistics pipeline, the maintenance concept (any scheduled or preventive maintenance event calendar or schedule), unit delivery schedules, deployed and stored weapon populations, the testing frequencies and policies, and any significant infrastructure or process element or constraint of the SUP. The network is completely defined by a list of static objects (primitives from a library available in DES software packages such as Extend), designer specified parameters for the primitives, a topology that specifies how the static objects are interconnected, and an instruction set that provides the mathematical or logic rules for manipulation of dynamic objects and calculation of statistics or other information.

The values of the attributes define a local state of each dynamic object and the parameters and other settings define local states for each static object. The states of all the static and dynamic objects define a global state for the modeled network. The simulation engine updates the future events schedule in accordance with current values of the local and global states, advances the simulation to the next state change along a timeline 36 and performs the logic dictated by the network. More specifically, the static objects operate on the dynamic objects and/or their attributes in accordance with their functional operators and global data. Common primitive operations include DO delays (scheduling DOs for Future Events), reading, writing, and/or performing arithmetic operations on attributes of DOs, splitting one DO into multiple DOs, or merging multiple DOs together, gathering and compiling information and statistics on DOs, seizing or releasing global static resources objects, and queuing DOs and routing DOs. The simulation engine defines and drives the timeline, updating the state of the modeled network at discrete points in time, those points generally being separated by unequal intervals of time.

A designer practiced in the art of simulation tasked to implement a straightforward application to the problem of modeling full-scale, life-cycle operations and support processes for weapons systems will encounter technical obstacles that include:

1) Granularity: How much detail (event break-down) is needed to provide meaningful outputs. This presents a scalability problem especially apparent when developing large models;
2) Sub-populations: How to handle and control sub-populations of the dynamic objects that encounter different environments thereby affecting the reliability of those members;
3) Reliability Change: How to characterize reliability growth in the model, i.e., the initial improvement of reliability for a new weapon program, and conversely how to model degradation of reliability, i.e. the eventual increase in failure rate as weapons age, given data provided from a service life extension study of a mature weapon system;
4) Weapons Testing Specifics: How to model test effectiveness for the weapon, false test alarms, and the possibility of multiple failures on the same piece of hardware;
5) Manageability: How to keep the model manageable: easy to modify, easy to understand by others, and
6) Reusability: How to make the model usable by others who may not be familiar with simulation and/or statistical design of experiments.

Figure 1C:
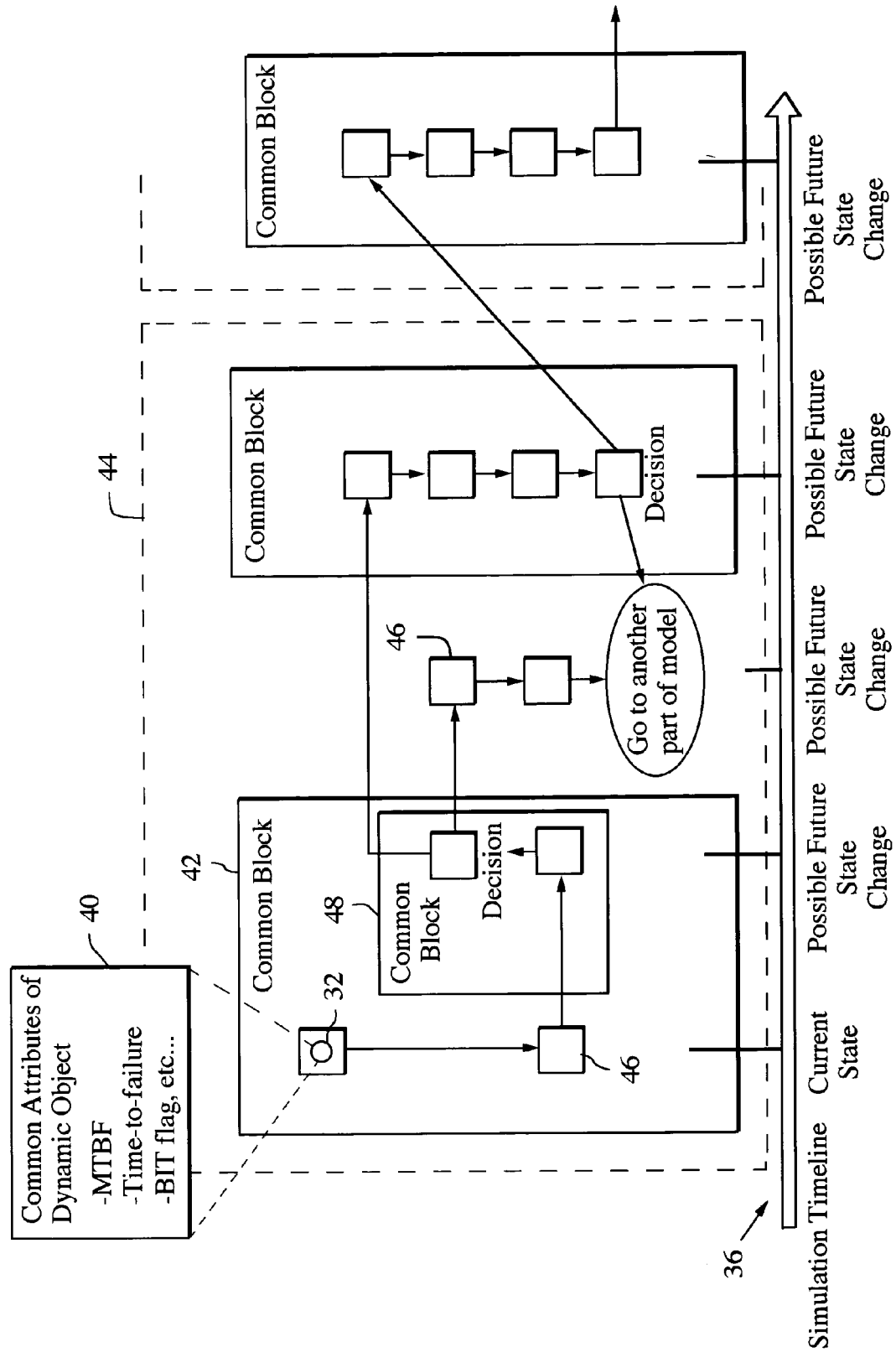
Figure 2:
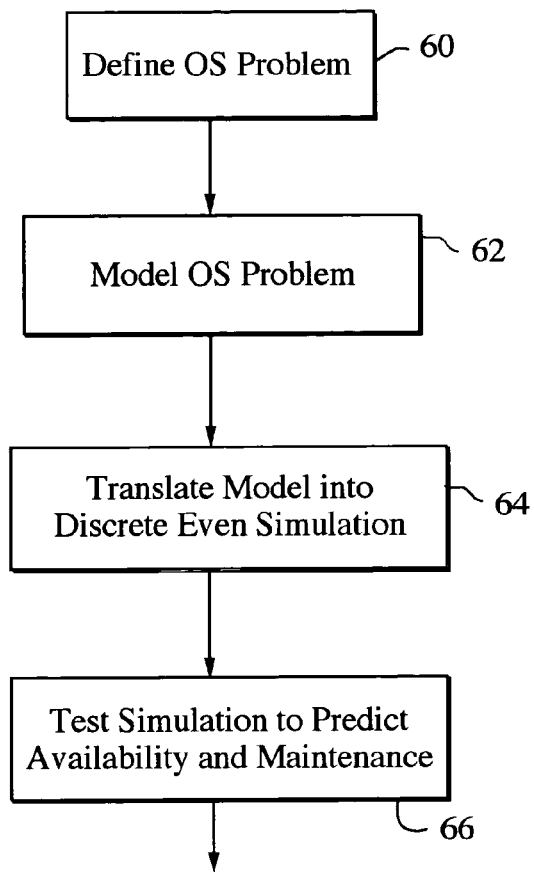
FIG. 2 is a flowchart of model development for the DES.

As shown in FIG. 1c, these obstacles are overcome through the creation and use of a "toolkit" in which common attributes 40 are defined for the dynamic objects 32, a library of common blocks 42 is provided, and sub-models 44 of common blocks and common attributes are defined. The dynamic objects have a minimum set of "common" attributes that standardize the data that is essential for calculating the time-based predictions. The common blocks 42 include a plurality of primitive blocks 46 and/or embedded common blocks 48 having a defined topology and instruction set to perform different functions that are generally useful and reused often when modeling and simulating O&S of missile and missile defense weapons systems.

The common blocks represent a higher level of functionality than the primitives, one that is tailored to the requirements of weapons systems simulations and pre-validated. The functionality of common blocks fall into one of three general types: DO routing based upon attributes of DOs and/or global data input to the block; DO modification based upon attributes of DOs and/or global data input to the block; and Statistics/Information calculation based upon DOs and/or global data input to the block. A designer may set specific parameters of the common or primitive blocks to tailor the function to a particular model. The sub-models 44 are an even higher level of functionality that, again, has been validated for weapons systems applications.

The creation and use of the toolkit will reduce the amount of time required to design, implement and validate a simulation. The use of pre-validated common blocks and synergistic combinations will improve the accuracy and the reliability of a simulation. The reuse of the toolkit by many designers for many different weapons systems will produce repeatable and consistent results that will only help to reinforce the validity of DES for these extremely large scale and complicated problems.

More specifically the challenges of a rote application of known modeling techniques and DES to the O&S problem for missile and missile defense systems are overcome. The granularity of the common attributes and the hierarchical structure of primitives, common blocks and sub-models address the granularity issue. The inclusion of a "Weapon Variant" common attribute allows tagging a dynamic object as being part of a specific subpopulation. Reliability growth and degradation of failure rate are addressed by characterizing the MTBF attribute as a function of DO age and/or weapon program maturity and using it together with a service life common block. A "BitDetectable" attribute, false alarm setting and a BIT common block together address problems of weapons testing. Lastly, the methodology of developing the model from the SUP together with the use of common attributes, common blocks and sub-models make the models and simulation more manageable and increasingly reusable.

Model and Simulation Development

The methodology for creating a comprehensive model that describes a particular missile or missile defense system and then translating that model into a valid and reliable discrete event simulation is complicated. The sheer scale of weapons systems O&S analysis, considering the number and differing variants of weapons, the complexity of weapons tests, the number of different observations that must be made, the interdependency of those observations, the granularity as a function of time and environment, etc. requires a systematic approach for developing the model and DES. The definition of a SUP and the use of the common attributes and pre-validated common blocks and sub-models simplify the process and improves consistency. For each designer to use an ad hoc approach using only the primitives supported by a particular software package and redefining all static and dynamic objects on a case-by-case basis would be inefficient and induce inconsistency between modeling projects.

At the highest level, the methodology includes defining the O&S problem (step 60), creating a model of the O&S problem based on a service use profile (SUP) that describes a logical structure of delivery, maintenance, deployment and testing policy, and infrastructure and logistics constraints (step 62), translating the model into a discrete event simulation (step 64) using common attributes, common blocks and sub-models, and validating the discrete event simulation (step 66).

At the level of actually designing and implementing a model, the methodology is far more complex. The steps are interdependent and iterative in nature to accurately characterize such complex systems. The methodology is as follows:

Formulate and Plan. The designer and the client(s) come together to discuss details of the system that is the basis for the simulation study. The designer becomes familiar in intimate detail with the characteristics and purpose of the system that is to be modeled, with any and all alternatives to be considered, and with the objectives of the simulation study as seen through the eyes of the client.

Model Definition and Data Collection. Data for an O&S study includes failure rate data of the weapon, testing frequencies, transportation times, and any constraining factors in the system, which together comprise the SUP. Defining the model involves determining which aspects of the system to represent, and at which levels of detail, versus aspects of the system judged not to add value to the study. Valid judgment depends on both the objectives of the study, and on the experience and expertise of the designer. The existence and later use of common attributes and common blocks will reduce the variability in model definition and data collection. The specific steps include:

Conceptualization of Service Use Profile (SUP): A Service Use Profile (SUP) can be thought of as a support system with the purpose of keeping an acceptably high-level of readiness of the weapons population at the lowest possible cost. The SUP defines the flow of weapons and possibly weapon sections and parts, through the support infrastructure over the weapon program life. This support infrastructure includes transport equipment, test equipment, maintenance facilities, storage facilities such as bunkers or magazines, and platforms for the deployment of the weapons (for training or combat) such as ships or aircraft. Implicit in the SUP is a maintenance concept that defines where repair or scheduled maintenance activity will occur (based on the type of maintenance performed), test/inspection policies, and the location for weapon or section spares pools. Multiple SUP concepts, often differing by maintenance concept, are typically considered for a new weapon support system. These alternatives are then measured against each other to determine the best concept for affordably and effectively deploying the weapons. If a SUP already exists for a weapon system, it will generally require decomposition or tailoring to meet the needs of the particular analysis. For example, a transportation node may be broken into air transport and rail transport if this detail is deemed important for the analysis.

The basic inputs for defining a SUP are (1) the maintenance/test concept, which includes (a) frequency and location of scheduled maintenance (if any), and (b) level of repair for unscheduled maintenance. The level of repair includes location of repair facilities (Field, Depot, or some intermediate location) and the type of repairs, e.g., removal & replacement of major section only and circuit card repair are two extremes. Other basic inputs to the SUP are (2) locations of spares pools to support repair actions, (3) test policies including frequency of routine "health checks" and event driven tests, e.g., pre-launch BIT, and (4) identification and characterization of environments weapons will encounter. Given a defined SUP, the remaining factors affecting the readiness of the weapons population are the inherent supportability characteristics of the weapon itself, e.g., inherent reliability, ease of test, and mean time to repair.

Preliminary Validation. All the above data, commonly referred to as "ground rules and assumptions", is disclosed and then approved by the client(s).

Rendering of SUP: Populations of Weapon/Defense elements are comprised of dynamic objects that are guided through a network object. The network object incorporates decision points (static objects) that are organized in accordance with the weapon SUP, e.g., test locations.

Decision Making: Decisions during simulation are made based on either the state of an individual dynamic object or a state of a static object at a specific point along the simulation timeline. State changes of the dynamic object or network object can be random in occurrence and/or time duration to approximate actual system variability.

Use of Common Attributes: As illustrated in FIG. 3, each dynamic object includes a minimum set of common attributes 80 that have been found to be useful in providing the desired detail and facilitating the desired observations. The set preferably includes the following attributes:

1. Birth Date 82: Stores time at which Hardware was first delivered and issued to inventory;
2. TTF Variate (m) 84: Stores the randomly determined time-to-failure (TTF) at which hardware will fail. Different values are defined for multiple environments. For example, storage, transportation, deployment. These are set/reset whenever hardware is issued/reissued. A cycles-to-failure (CTF) may also be used;
3. Duty Cycle (m) 86: Accumulators for time or cycles spent in various states/environments. These are reset to zero whenever hardware is reissued;
4. Warranty Cycle (m) 88: Accumulators for time or cycles spent in various states/environments. These are never reset;
5. Down Time 90: Accumulator for time spent while hardware is not RFI.
6. MTBF (m) 92: Stores Mean Time Between Failure for specific environments, which can change over the life of the weapon to approximate reliability growth or hardware degradation over time. MTBF can also be correlated to Weapon Variant;
7. BitDetectable 94: Randomly generated flag to indicate if a test will be effective at detecting a failure in the weapon hardware;
8. Weapon Variant (m) 96: Marks the dynamic object as being a particular type of weapon, i.e. belonging to a particular sub-population; and
9. GodsEye 97: Indicates whether a defective weapon object is detectable by field test equipment.

Characterization of Sub-Populations: The characterization of sub-populations of weapon variants using sub-groups of dynamic objects, where these sub-groups are controlled according to the rules of the SUP (e.g., Weapon Variant A has a different scheduled maintenance schedule than Weapon Variant B, or a different MTBF than Weapon Variant B).

Correlating SUP to network: A standardized level of detail for the SUP, correlated to the "granularity" of the blocks and decision points of the network object, providing a sufficiently accurate representation for typically encountered O&S analyses needs in defense industry and government. Standardized level of detail is facilitated through the use of the common block library.

Standard conceptual methods: Standard conceptual methods are used to apply the DES object/common attribute scheme and general DES constructs such as global resource blocks, to handle specific problems encountered when modeling O&S processes.

Figure 4:
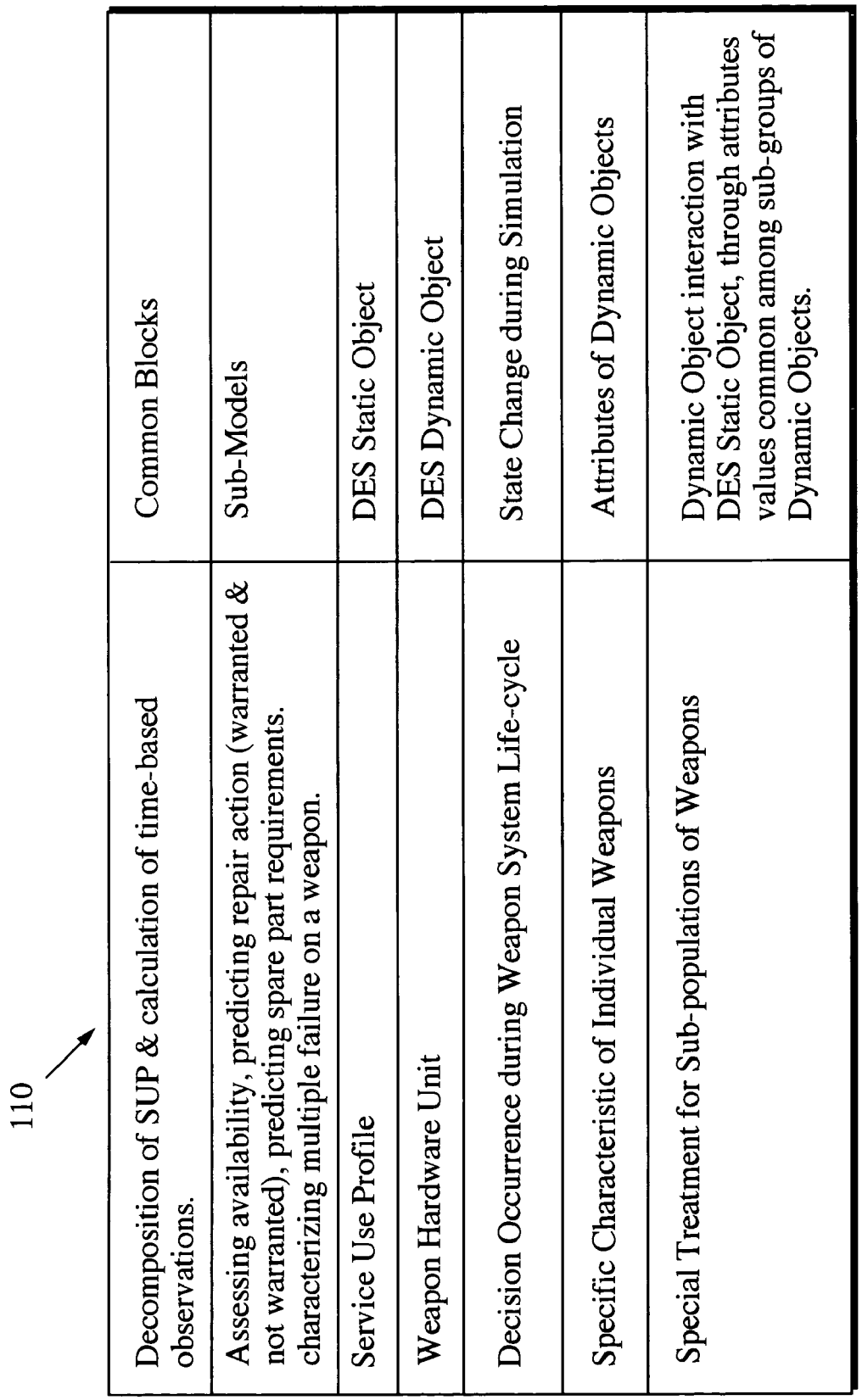
FIG. 4 is a matrix that translates the model into a DES.

Construct Computer Model and Verify. The conceptual model with the validated ground rules and assumptions is translated into computerized form. Elements cross-referenced between the conceptual model and computer model are illustrated in matrix 110 in FIG. 4. The SUP, after tailoring to a level of detail consistent with standardized common blocks, is converted into a network of DES static objects. Weapon hardware units are represented by dynamic objects in which specific characteristics of individual weapons are represented through attributes of the dynamic objects. Sub-populations of weapons are treated differently by defining different interactions for, and alternate routing between, the dynamic and static objects. Higher levels of functionality in the SUP are provided by sub-models constructed from combinations of common blocks referencing common attributes of the dynamic objects.

Figure 5:
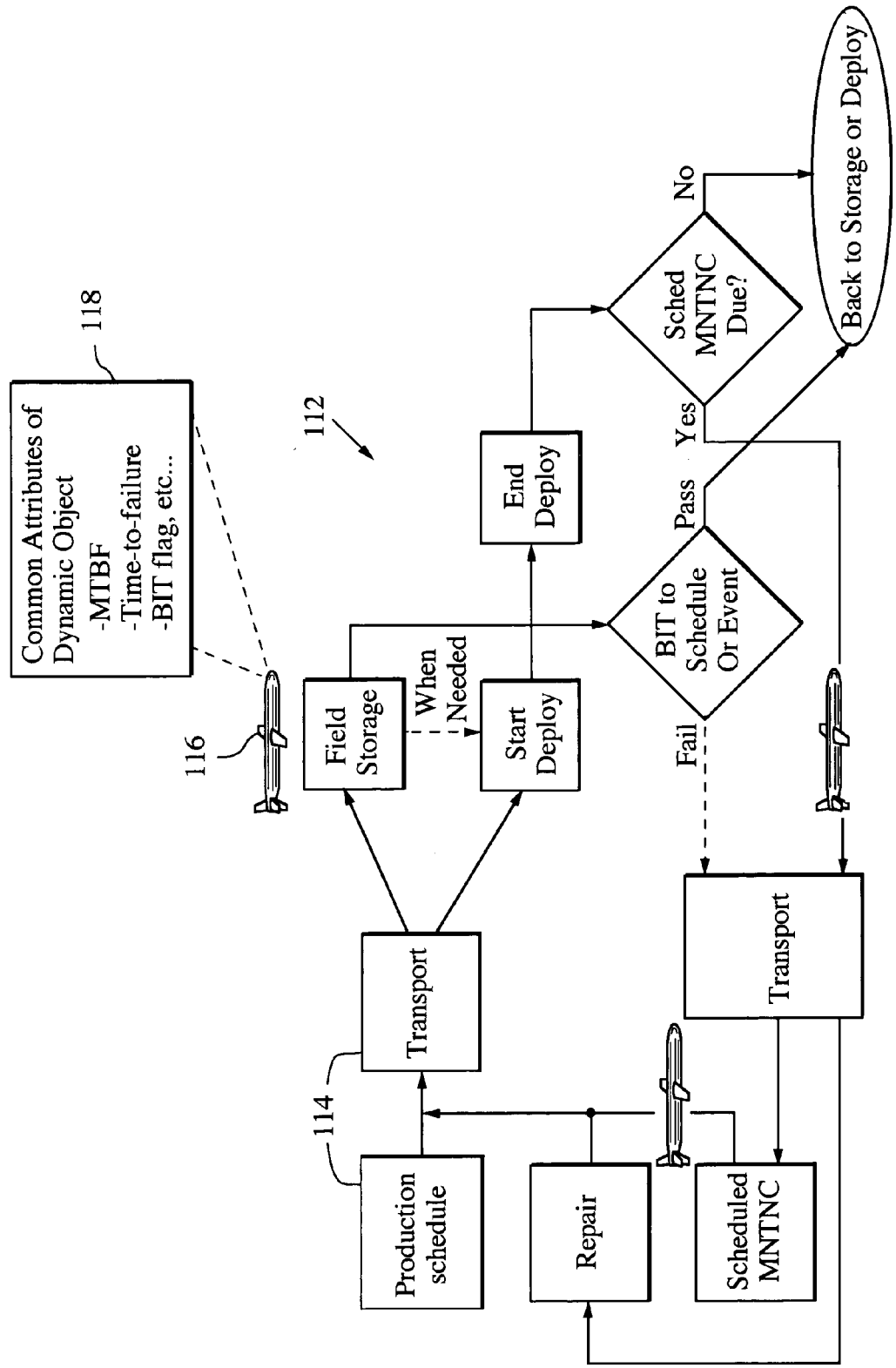
FIG. 5 is block diagram of a support use profile (SUP) represented as a network of static objects.
Figure 6:
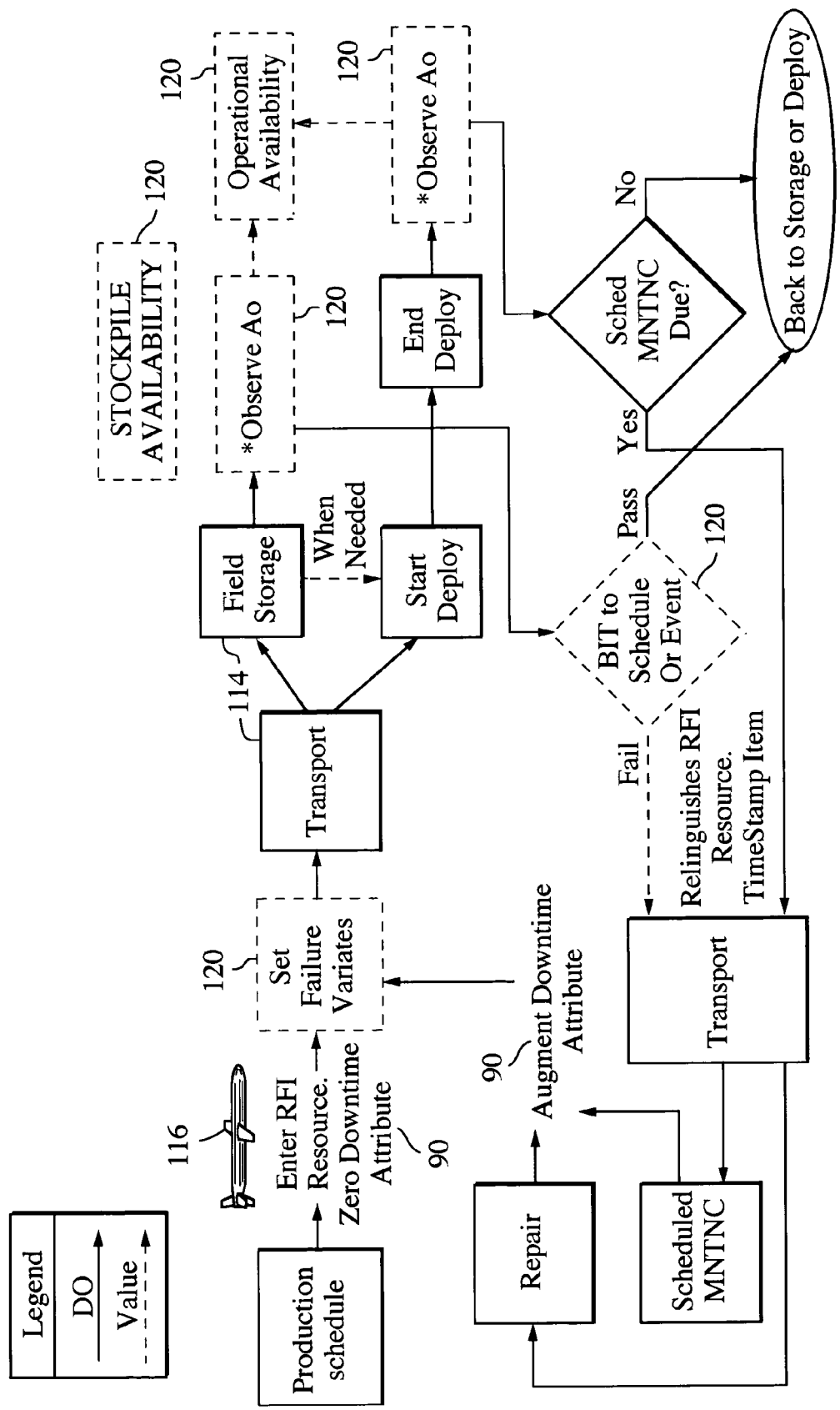
FIG. 6 is the block diagram of the SUP incorporating common blocks to monitor weapons availability.

FIG. 5 is a simplified display of a SUP shown as a network 112 of static objects 114 (solid lines) that is traversed by dynamic objects (missiles) 116 having common attributes 118. In this particular example, the static objects would represent such functions as transportation, storage, repair, production schedule and testing. As illustrated in FIG. 6, common blocks 120 (dashed lines) have been added to the network to support the computation of the time-based predictions of both stockpile and operational availability. FIG. 6 also illustrates the use of common attributes via reading and augmentation of the downtime attribute 90.

At this point the computer model must be verified. This is not low-level debugging of the computer program (debugging of this type must be done before verification), but rather a process for ensuring that the computer rendering faithfully and accurately reflects the conceptual model. Verification of the model logic is performed by checking the output of portions of the model with hand calculations (colloquially called "sanity checks"), and through using animation, common in many simulation packages, to ensure dynamic objects (weapons) are moving as expected through the computer modeled process flow. The use of previously verified common attributes and common blocks will streamline and shorten the verification process.

Experimental Design. The goal of experimental design is to obtain statistically valid results from the simulation. Most O&S simulations will involve what statisticians call transient conditions: production ramp-up, en-mass happenings such as the recalls of weapons from the field for scheduled maintenance, or wartime engagement attrition. Transient or replicating simulation models involve multiple runs (i.e., replications). The other alternative to replicating simulation would be steady state simulation, where a simulation model is run only once, but goes through a "warm-up" period. The number of runs required for the replicating simulation is determined during the pilot runs. There are very complex mathematical ways to do this, however, it is easier and simpler to just run the model and bracket the replication quantity (increase lower bound, decrease upper bound), until a safe, yet minimal, number of replications is found. Within a replicating simulation there can be metrics that should reach steady-state before they are reported. Availability is a good example: during delivery ramp-up availability can vary widely as the population (therefore the sample size) can start very small. Therefore, the running averages of population availability may be reset after the production program ends. Resetting a statistic throws out previous observation, so that subsequent observations are not biased by the earlier ones. This capability is built into the computer model.

Pilot Runs and Final Validation. Preliminary simulation runs are conducted to 1) get a statistical feel for model output, 2) provide results that can be used to plan later production runs (determining sensitive parameters of the system, indicating future trades study needs), and 3) provide validation. If the computer model has been built for an existing system and performance measures have been collected for the system, then direct comparisons can be made to validate the computer model. If the computer model is constructed for a system that does not as yet exist, then a comparable existing system should be used.

Production Runs. Full simulations are conducted to obtain output data including time-based prediction of weapons availability, maintenance activities, and spare parts stock over a life cycle of the weapons system.

Analyze Output Data. Output results are compared to estimate system performance under different system settings. Sometimes statistical analysis such as hypothesis testing is required to determine if differences between two simulations are significant.

Document and Implement Results. The objectives, ground rules and assumptions, experiments conducted, and results are recorded and presented to client(s) to aid their decisions.

Common Blocks

Figure 7:
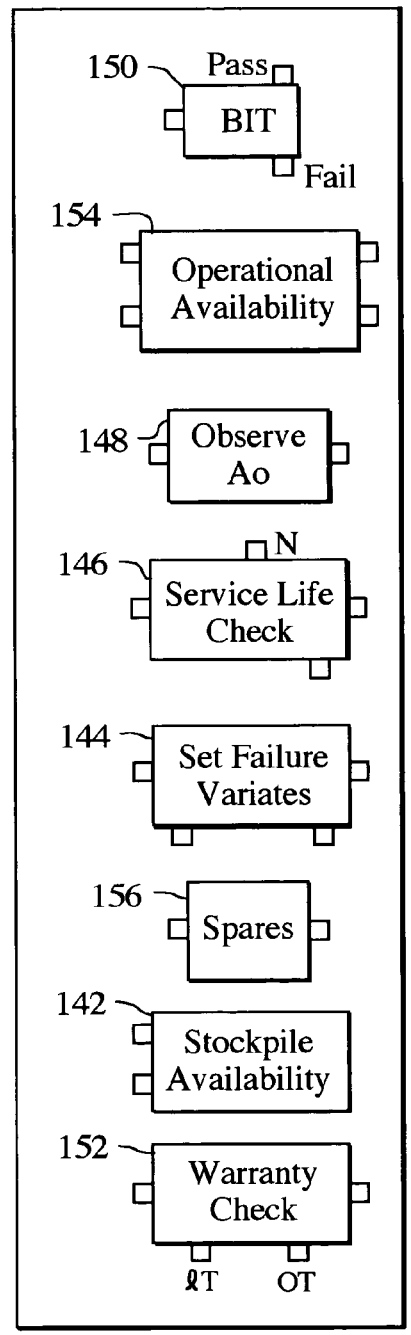
FIG. 7 is a view of a library of common blocks useful in simulating weapons and weapons defense systems.

Common blocks represent a higher level of functionality than the lowest level operations performed by the primitive blocks provided in the simulation software package. The functionality is both common in weapons system models and useful in providing the time-based predictions. As shown in FIG. 7, the use and reuse of a library 140 of pre-defined and pre-verified common blocks including but not limited to a Stockpile Availability block 142; Set Failure Variates block 144, Service Life Check block 146, Observe $A_0$ block 148, BIT Test block 150, Warranty Check block 152, Operational Availability block 154, and Parts Spares block 156 is far more effective than recreating the functionality on the fly in an ad hoc manner. The resulting models are more reliable and produce more consistent results.

Figure 8:
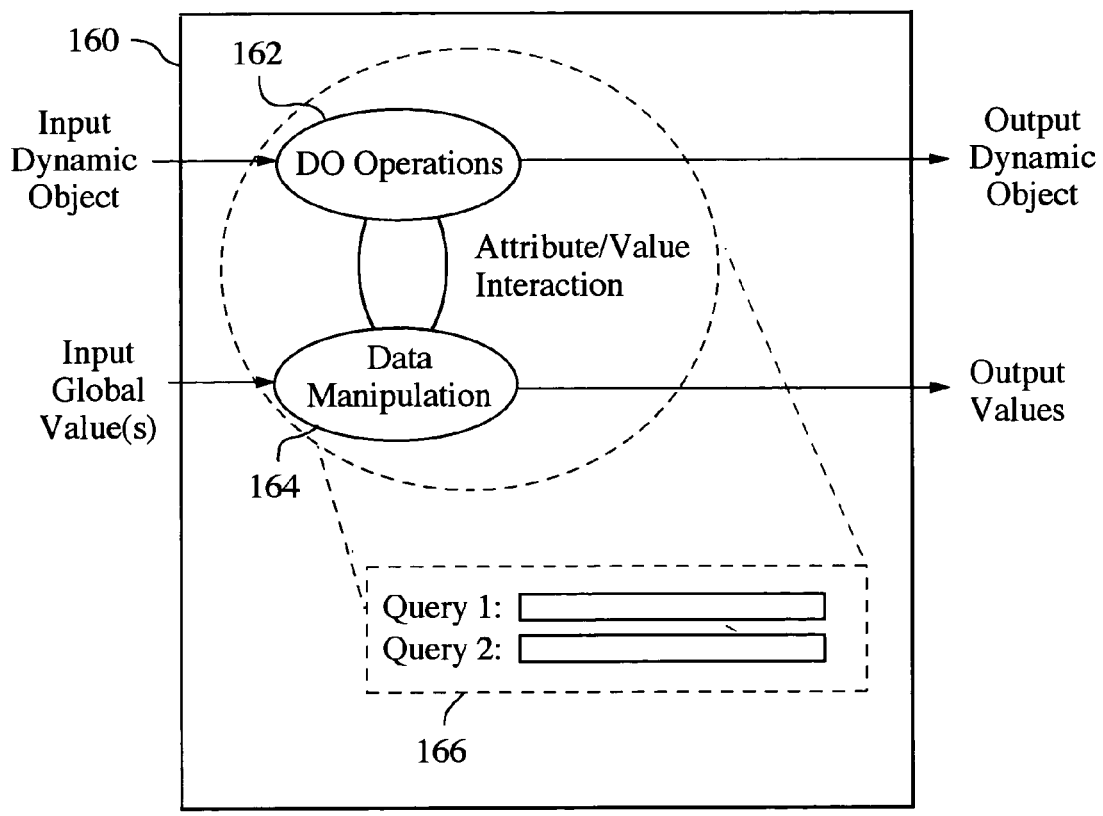
FIG. 8 is a block diagram of a generic common block.

As shown in FIG. 8, a common block 160 comprises a plurality of primitive blocks and embedded common blocks configured with a defined topology and instructions set to perform dynamic object (DO) operations 162 and data manipulation 164. The common block receives as inputs a dynamic object and/or global data and outputs the updated dynamic object and/or global data. The schema (topology and instruction set) of primitives/blocks and data used within a given common block defines its function, which fall into one of three general types: (1) DO routing based upon attributes of DOs and/or global data input to the block, (2) DO modification based upon attributes of DOs and/or global data input to the block, and (3) Statistics/Information calculation based upon DOs and/or global data input to the block.

The common block can be tailored for a specific model by specifying parameters, constraints, etc. via an interface 166. Primitive static blocks within common blocks have fields whose values are initially adjusted by the designer, and may later be changed by a user. For example, a random number generator primitive within a common block may have a menu for describing a particular statistical distribution, and a field for the mean parameter of that distribution. If these fields are deemed important to the function of the common block, and if the software technology allows, those fields could be made an interface 166 for the common block itself, enhancing the future usage of the common block 160.

Stockpile Availability

The Stockpile Availability block provides a measure $A_s$ of the percentage of weapons in a stockpile that are "ready for issue" (RFI) into deployment. $A_s$ is a purely "numbers" based statistic (as opposed to Operational Availability which is "time" based). $A_s$ is one important indicator of the readiness of a population, indicating the percentage of the deployed inventory that will work whenever called upon. The denominator RFI is driven by factors of the support-system SUP such as maintenance and transport times, and inherent reliability of the hardware. $A_s$ is a measure of how all these factors fold together to support the readiness of the inventory.

| The Stockpile Availability block is defined as follows: | |
|---|---|
| Inputs: | (1) RFI: RFI is the number ready for use; |
| | (2) Nd: Nd is the numbered delivered to the stockpile; and |
| | (3) Att: Att is the attrition or number spent. |
| Function f( ): | As = RFI/(Nd − Att) |
| DO Manipulation: | None |
| Outputs: | (1) $A_s$ (running average, scalar and time-plotted); and |
| | (2) Hardware unit population |

Figure 9:
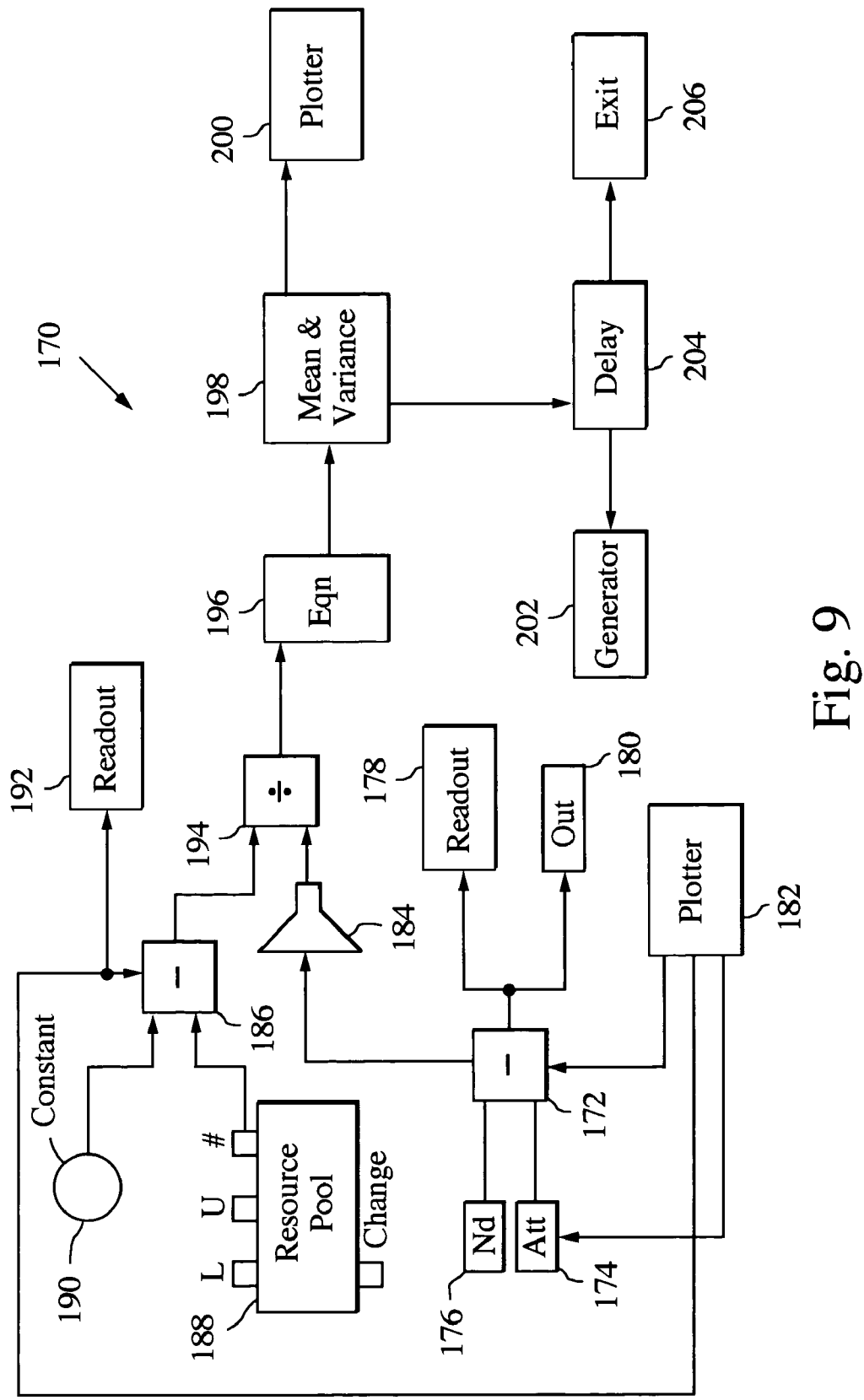
FIG. 9 is block diagram of the Stockpile Availability common block.

As shown in FIG. 9, the Stockpile Availability block 170 is implemented using a number of primitive blocks. The primitives used, the topology and the instruction set are determined by the simulation software and designer choice, other combinations may be equally effective. To form the denominator, a Subtraction primitive 172 subtracts the attrition (Att) input 174 from the number of weapons delivered (Nd) 176. The denominator value is passed to a Read Out primitive 178 to make this value available for display during simulation, an output connection 180 of the encasing block to make this value available for use through connection to other external blocks, one input to a Plotter primitive 182 that provides a time-based graph of population changes, and a Stop Message primitive 184 that ensures proper input as a denominator in the next primitive. To form the numerator, a Subtraction primitive 186 subtracts the units of resource available (NOT RFI) generated by a Resource Pool primitive 188 from the capacity of the resource pool provided by a Constant primitive 190. The Resource Pool primitive, a utility common to many simulation software packages. It is used here for tracking hardware that is RFI. Hardware uses one unit of resource when RFI and relinquishes that unit whenever becoming not RFI, e.g., the hardware fails BIT or becomes due for scheduled maintenance. The advantage of using the Resource Pool primitive is that it is global and can be easily referenced and updated from anywhere within the model. The numerator value is passed to a Read Out primitive 192, a second input of Plotter primitive 182 and a Division primitive 194.

Division primitive 194 divides the numerator by the denominator to calculate the stockpile availability $A_s$. An Equation primitive 196 contains an equation to ensure that the initial input to the Mean and Variance primitive 198 is one and never zero thereby producing input for a smooth curve to be plotted in the Plotter primitive 200. The Generator primitive 202 produces one dynamic object at a user specified time. At that time this object is briefly delayed in Delay primitive 204. This Delay primitive sends a positive signal from its "T" connector to reset the Mean and Variance primitive 198, effectively resetting the running average at that user specified time input to primitive 202. Running averages of $A_s$ are typically reset (old observations discarded) after delivery ramp-up. The dynamic object is then discarded in the Exit primitive 206. The plotter and display field from this block can be used to provide plotted or scalar $A_s$ statistics as part of an output interface of the model, or this common block.

Set Failure Variates

The DES O&S model will have dynamic objects with MTBF and Time-To-Failure (TTF) Variate attributes. The Set Failure Variates block ensures that those MTBF attributes are correctly read, converted to the correct time units, used as mean parameters in (default) exponential random number generators that generate single TTF Variates of that distribution to be written to the appropriate TTF Variate attributes of the dynamic object. Multiple TTF attributes provide statistically determined thresholds for failure in multiple environments, e.g. stored, transported or deployed. If one threshold is breached, the dynamic object is in a "true" failed state. Not until the dynamic object is (effectively) tested through the BIT common block, will corrective action be taken. The Set Failure Variates block also determines if the next failed state will be detected by BIT by randomly assigning, with user specified probability, either a 0 or a 1 to the object's BitDetectable attribute.

| The Set Failure Variates block is defined as follows: | |
| --- | --- |
| Inputs: | (1) Dynamic Object; |
| | (2) Test Effectiveness |
| | (3) MTBF values (multiple for different environments) |
| Function f( ): | Exponential (default) for calculating failure variates Specifically TTF = MTBF( −ln(1 − r)), or if using cycles CTF = MCBF( −ln(1 − r)), where r is Uniform RN[0 . . . 1] |
| DO Manipulation: | Assign Attributes |
| Outputs: | (1) dynamic object with defined TTF Variates |
| | (2) dynamic object with defined BitDetectable attribute |

Figure 10:
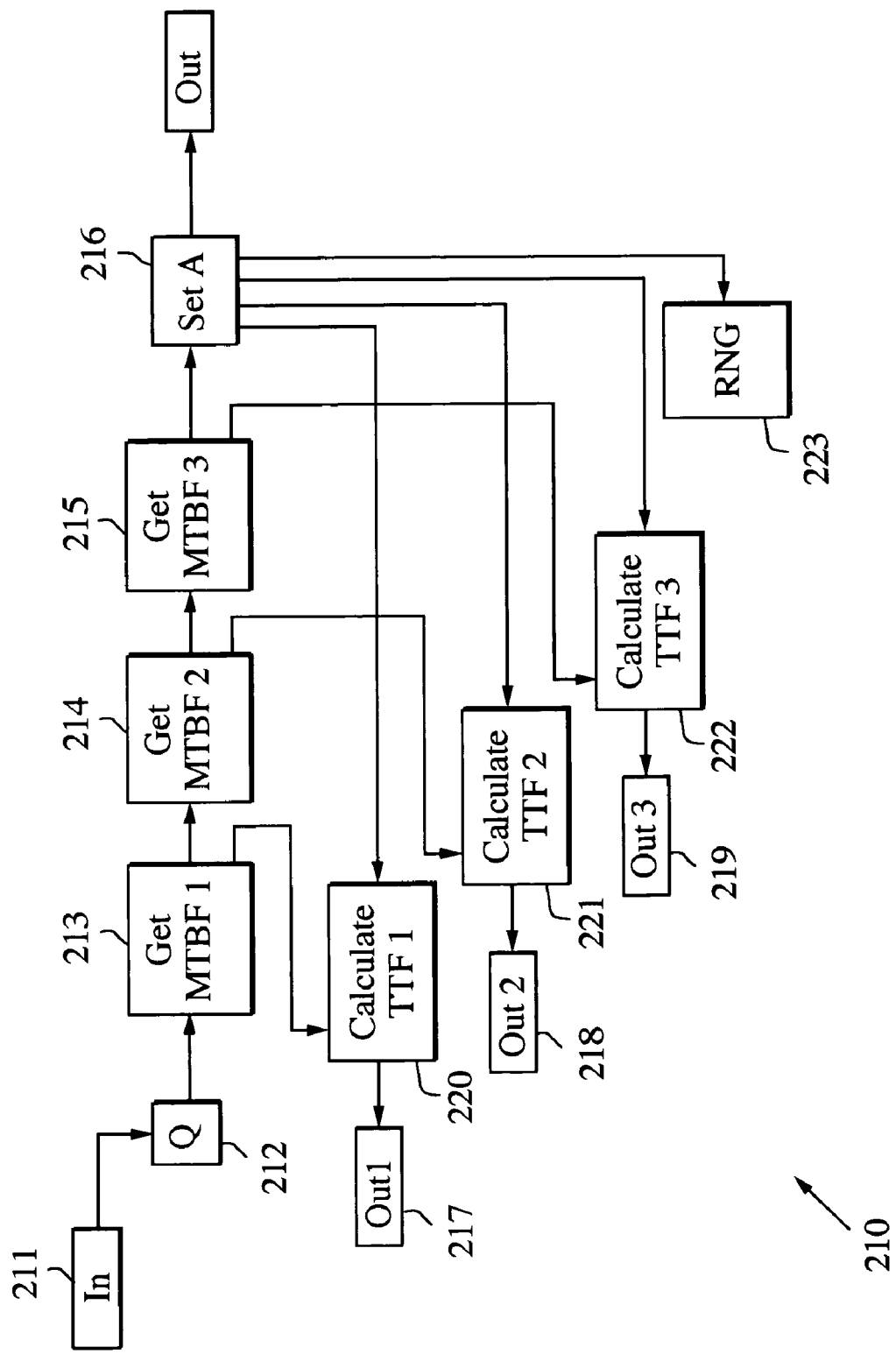
FIG. 10 is block diagram of the set Failure Variates Common block.
Figure 11:
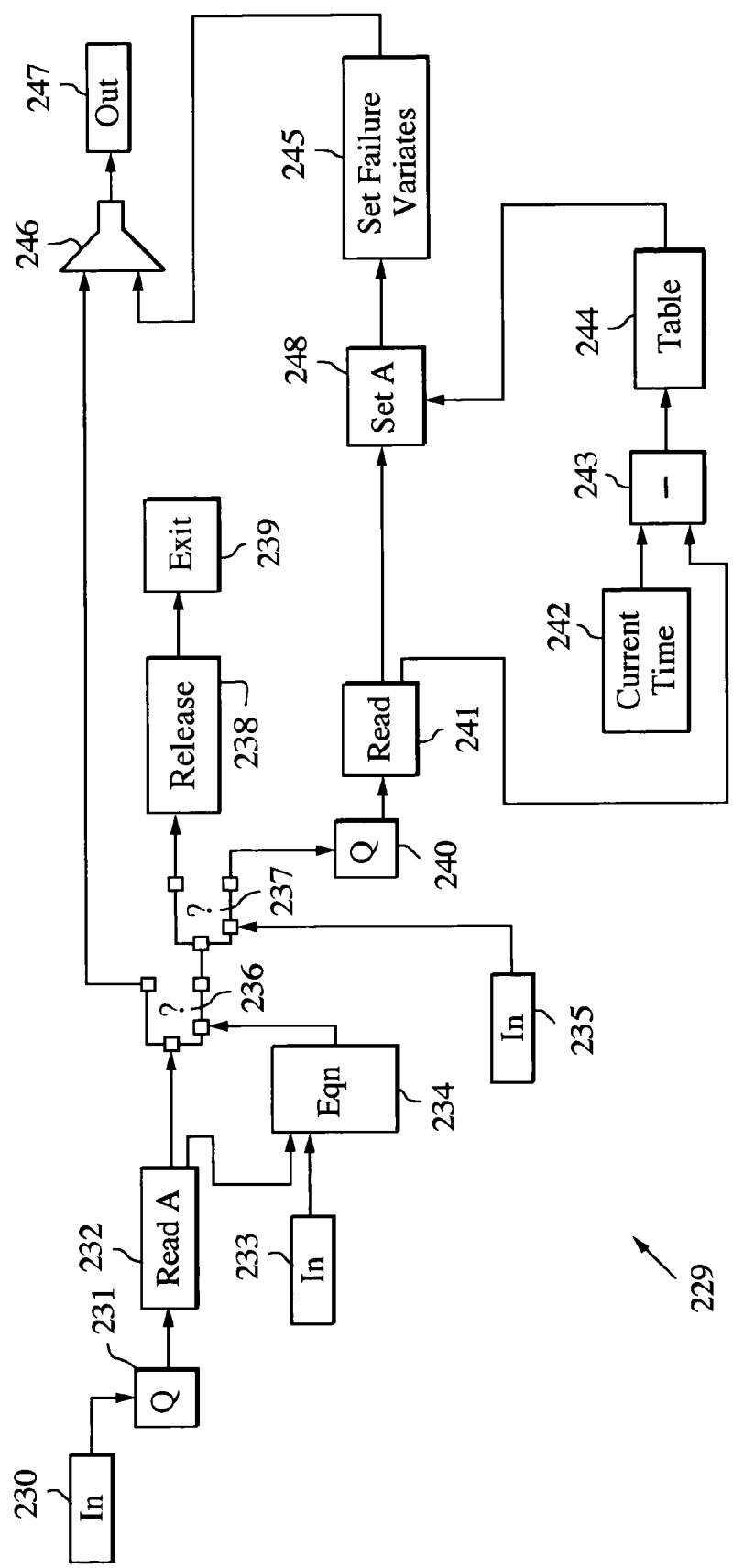
FIG. 11 is block diagram of the Service Life Check common block.

As shown in FIG. 10, the Set Failure Variates block 210 is implemented using a number of primitive blocks and embedded hierarchical blocks (H-blocks). The primitives and H-blocks used, the topology and the instruction set are determined by the simulation software and designer choice, other combinations may be equally effective. The dynamic object enters the block through object Connector 211, and then a Queue primitive 212. The Queue prevents the corruption of downstream data in cases where dynamic objects arrive simultaneously, by releasing objects one at a time through the common block. Multiple MTBF attributes 213, 214, 215 corresponding to different environments are read from the dynamic object and sent to multiple H-blocks 220, 221, 222. Each of these H-blocks converts input MTBF values into the global time units specified by the designer. (if using cycles, MCTF inputs are unaffected.) These converted MTBF values are sent out from the left-side of the H-blocks 220, 221, 222, and then out of the common block through connecters 217, 218, 219 for possible use in other external blocks. Also, H-blocks 220, 221, 222 use the converted MTBF as mean parameters in a random number generator contained within each H-block. The default distribution is exponential, so that the resultant output from the right-side of the each H-block are single point variates from exponential distributions. These values are sent to Set Attribute primitive 216, assigning TTF thresholds to the appropriate attribute on the dynamic object. The DutyCycle attributes are also zeroed in Set Attribute primitive 216. The Random Number Generator primitive 223 randomly generates, with user specified probability (the test effectiveness), a value that will determine if the dynamic object, should it fail in the future, be detectable by the field test equipment. This binomial value is assigned to the dynamic object by the Set Attribute primitive 216.

Service Life Check

The Service Life Check common block has flexible functionality. It is used to make decisions on how to handle dynamic objects if they age beyond a user defined service life. If the age of dynamic objects that enter this block is determined to be greater than the specified service life, a decision is then made to either 1) take the dynamic object out of inventory and destroy it or 2) assign a new MTBF to the item, the value of which is determined from a user specified function that can be time-based. For this second option, the failure variates (TTF and MTBF) of the dynamic object are then reset in an embedded Set Failure Variates common block. Making MTBF progressively smaller as a function of time effectively approximates the "wear-out" of weapon hardware when aging beyond its specified service life. This is a powerful modeling detail for producing models designed for analyzing service life extension of mature weapon systems, where there is much historical reliability data to draw upon. Service Life Check blocks are multiple and strategically placed in the SUP model to ensure prompt implementation of their functions on the modeled population.

| The Service Life Check block is defined as follows: | |
| --- | --- |
| Inputs: | (1) Dynamic Object; |
| | (4) User specified service life threshold (N); |
| | (3) User specified decision flag to decide to either destroy object or change MTBF |
| Function f( ): | Calculation of weapon object age and comparison with N |
| DO Manipulation: | Possible removal (destruction) from model. Possible update of MTBF and TTF variates. |
| Outputs: | (1) dynamic object with updated TTF variates |

As shown in FIG. 10, the service life check block 229 is implemented using a number of primitive blocks and an embedded hierarchical block (H-block). The primitives and H-block used, the topology and the instruction set are determined by the simulation software and designer choice, other combinations may be equally effective. The dynamic object enters the block through object Connector 230 and then a Queue primitive 231. The Queue prevents the corruption of downstream data in cases where dynamic objects arrive simultaneously, by releasing objects one at a time through the common block. The Birth Date attribute of the dynamic object is read by the Read Attribute primitive 232 and then input to Equation primitive 234. Also input to the equation is the specified global service life provided through value input connector 233. The Equation primitive 234 calculates the current age of the weapon and compares this value to the global service life. Based on this result, the equation outputs a binomial to the Select Output primitive 236 that routes the dynamic weapon object to its top output (age of weapon object less than service life) or bottom output (age greater than service life). If age is less than the specified service life, the weapon object is routed to the Combine primitive 246, that simply combines objects from two sources to one path, and then out of the common block through connector 247.

In cases where the dynamic object age is greater than the service life, the dynamic object is routed to another Select Output primitive 237 where, based upon the value of the user specified decision flag provided through input connect 235, the dynamic object is to be either taken out of service or have its MTBF and TTF Variates updated. If taken out of service, the dynamic object is routed to Release Resource Pool primitive 238, where one unit from the global RFI resource pool will be relinquished to update the stockpile availability statistic, and then destroyed with the Exit primitive 239. If based upon the value of the user specified decision flag the dynamic object is not taken from service, it is routed through another Queue primitive 240 to a Read primitive 241 where its Birth Date attribute is accessed again to calculate its age using a Current Time System Variable primitive 242 and Subtraction primitive 243. The dynamic object's age, current time minus Birth Date, is input to a Conversion Table primitive 244 that correlates the age input to an MTBF output. The output can either be stepped or interpolated for age inputs falling between the tabular data provided in this primitive. The updated MTBF output from Conversion Table primitive 244 is sent to Set Attribute primitive 248 which supplies the new MTBF to the dynamic object. New TTF variates are provided to the object with embedded common block Set Failure Variates 245 before the dynamic object exits through Combine block 246 and output connector 247.

Observe $A_O$

The observe $A_O$ common block is designed to be used in conjunction with the operational availability common block. It calculates and outputs multiple single point estimates of $A_o$ that are used by the operational availability block to find an average operational availability statistic for the population. This common block is to be placed strategically at multiple points throughout the main model. The single point estimate is calculated as: $A_O s$ ($A_o$ single point)=1−Down Time(DT)/(CurrentTime−Birth Date(BT)).

| The Observe $A_o$ block is defined as follows: | |
|---|---|
| Inputs: | (1) Dynamic Object; |
| Function f( ): | $A_O s = 1 - DT/(CurrentTime - BT)$ |
| DO Manipulation: | None, Birth Date and Down Time attributes are read only |
| Outputs: | (1) Single point estimate of $A_o$ |
| | (2) Count of the number of observations to date |

Figure 12:
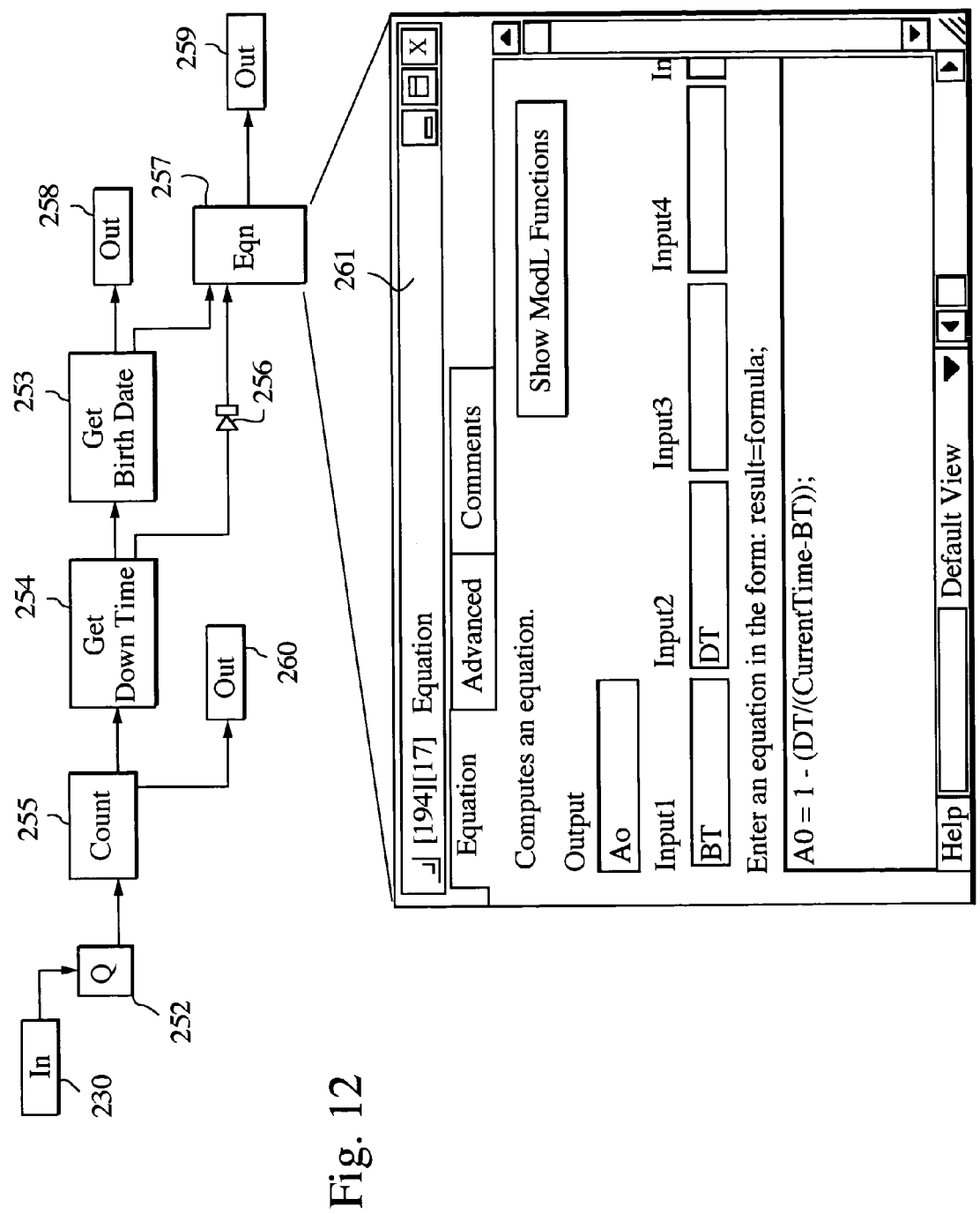
FIG. 12 is block diagram of the Observe $A_o$ common block.

As shown in FIG. 12, the Observe $A_O$ block 250 is implemented using primitive blocks only. The primitives used, the topology and the instruction set are determined by the simulation software and designer choice, other combinations may be equally effective. The dynamic object enters the block through object Connector 251 and then a Queue primitive 252. The Queue prevents the corruption of downstream data in cases where dynamic objects arrive simultaneously, by releasing objects one at a time through the common block. The dynamic object's Birth Date and Down Time attributes are read with Get Attribute primitives 253 and 254, respectively, after the total number of observations is incremented by Count primitive 255. This total "CountOut" is sent out from the common block through a value output Connector 260. Stop Message primitive 256 ensures Down Time value is correctly used with Birth Date value in the Equation primitive 257. This primitive calculates $A_O s$ as defined via a dialog box 261 and sends the value out of the block through output value Connector 259. The dynamic object leaves unmodified through item output connector 258. Note that value outputs $A_O s$ are to be read continuously from this block by the Operational Availability common block, whereas the cumulative count values are to be read at set discrete point along the simulation timeline. The reason for this will be explained in the Operational Availability common block.

Operational Availability

Operational availability ($A_o$) is an important indicator of the readiness of a population. It is a time-based statistic (as opposed to Stockpile Availability which is "numbers" based. It essentially indicates the mean amount of time weapons spend in an operational state. This block works synergistically with the Observe $A_O$ common block that feeds single point estimates, or variates, of the overall average $A_o$ to be calculated by this common block. $A_o$ is driven by factors of the support-system SUP such as maintenance and transport times, and inherent reliability of the hardware. This statistic is a measure of how all these factors fold together to support the readiness of the inventory.

| The Operational Availability block is defined as follows: | |
|---|---|
| Inputs: | (1) variates of $A_O s$, observed from multiple points in the main model, |
| | (5) corresponding counts of the number of observations from each observation point. |
| Function f( ): | running averages, reset periodically, are multiplied by the cumulative number of observations for each average, effectively weighting the average for each $A_O s$ input. These weighted averages are then added together and divided by the total cumulative observations, yielding an overall Ao for the population. |
| DO Manipulation: | None |
| Outputs: | (1) $A_o$ (running average, scalar and time-plotted) |

Figure 13:
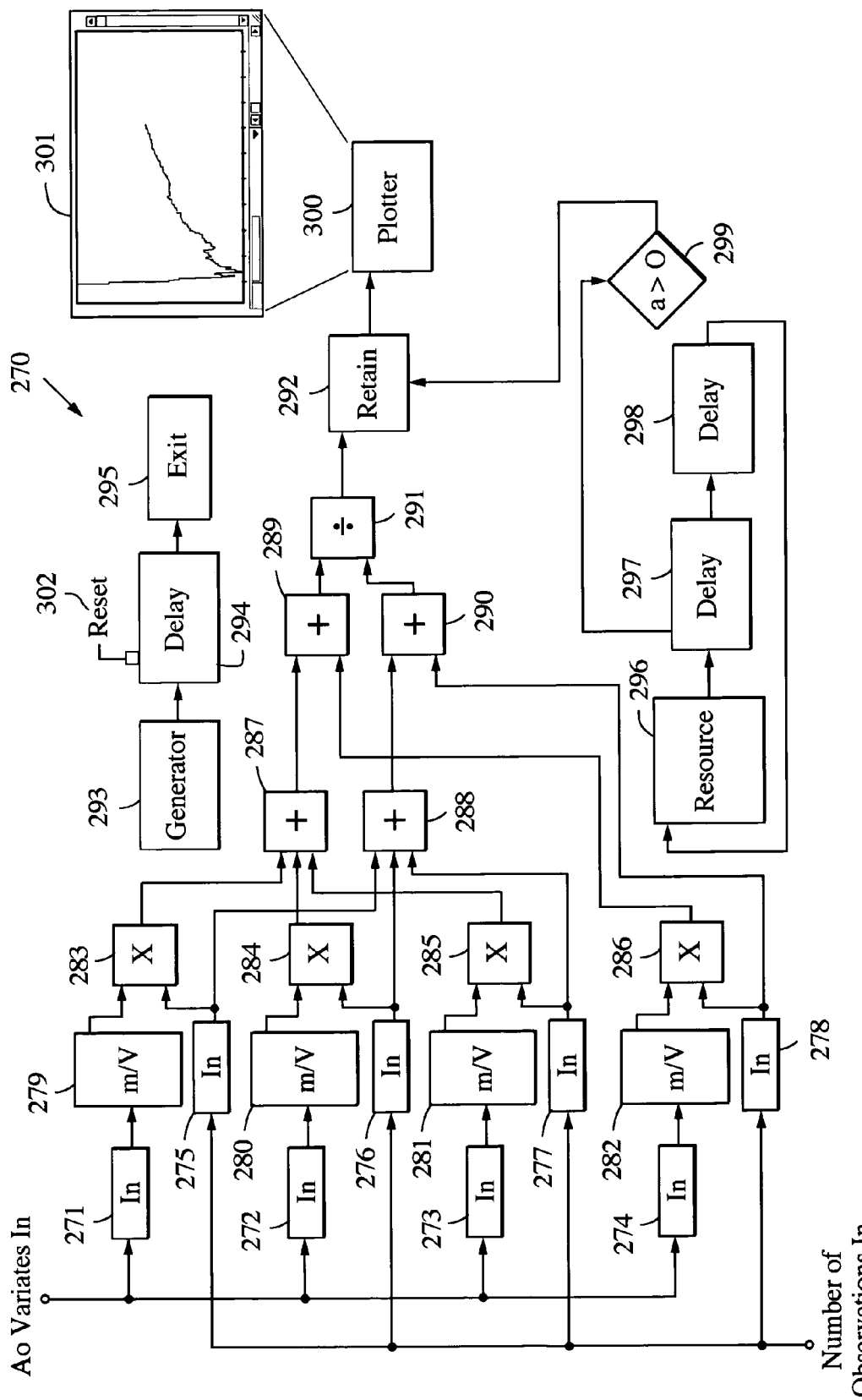
FIG. 13 is block diagram of the Operational Availability common block.

As shown in FIG. 13, the Operational Availability common block 270 is implemented using a number of primitive blocks. The primitives used, the topology and the instruction set are determined by the simulation software and designer choice, other combinations may be equally effective. The default configuration of this model accepts four $A_O s$ variates from four points in the main model. Therefore there are four value input connectors for $A_O s$ 271, 272, 273 and 274 and four value input connectors feeding cumulative counts from each location 275, 276, 277 and 278. The $A_O s$ values are input to Mean and Variance ("M/V") primitives 279, 280, 281 and 282 that maintain running averages of their inputs that are updated every instance a weapon object is observed from the respective Observe $A_O$ common block. These averages from primitives 279, 280, 281 and 282 and the corresponding number of observations from connectors 275, 276, 277 and 278, feed Multiplication primitives 283, 284, 285 and 286, yielding weighted averages from each location. The weighted averages are summed with Addition primitives 287 and 289, and input as the numerator to Division primitive 291, whose denominator is the sum provided from Addition primitives 288 and 290 of all observations. Division primitive 291 outputs a mean population $A_0$ to a Retain primitive 292. The Retain primitive block holds and outputs a constant value until reset through its bottom "T" connector. When it is "pulse" reset, it will then read the value at its input, hold and output that value until it is "pulsed" again. The Retain primitive is used is to provide periodic, rather than continuous, data stream to the Plotter primitive 300 (thus saving computer memory and preventing the Plotter from data overflow) that plots a running average of the mean 301. Blocks 296, 297, 298 and 299, a Resource, two Activity Delays, and a Decision primitive block provide the periodic "pulsed" reset to the Retain primitive 292.

This common block is designed so that the user may reset the overall running average of operational availability anytime desired (normally after all deliveries of weapon objects). To do this a Generator primitive 293, feeds one DO, at a user-specified time, to Activity Delay primitive 294, and Exit primitive 295. The Activity Delay holds the DO for a very short instance, sending a pulse reset signal through Named Connector (Reset) 302, and resetting the Mean and Variance primitives 279, 280, 281 and 282. The Generator primitive 293 contains a field for specifying the time a DO is generated to affect a statistics reset. This field, and the Plotter primitive 300, are typically included in a user interface for the main model.

Built-In-Test (BIT)

Field BIT is a common means for testing weapon hardware. It involves field test equipment and also hardware circuitry contained in the weapon itself Today's weapons are very complex machines and, as they have grown in complexity, they have become more difficult to reliably test. Two common measures for indicating the fallibility of field test equipment applied to weapons are 1) test effectiveness and 2) false alarm rate. Test effectiveness can be defined in more than one way. For this method test effectiveness is defined as the proportion of the weapon hardware that is susceptible to the test equipment. Defined as such, faults that occur on the modeled dynamic object can be considered to be either "inside" that proportion that is susceptible to test, or "outside" of that test-susceptible proportion. The other measure of fallibility of the test equipment, false alarm rate, is not so complicated to model (although likely very complicated to mitigate in reality). This is correctly treated as a randomized rate of false positives to characterize the sporadic nature of this limitation in the test equipment.

Complicating the problem of modeling BIT is the fact that complex hardware can contain multiple faults. After considering the fact that missile hardware almost never contains redundant systems, in other words, one defect will always fail the whole unit, multiple faults may not seem to present such a problem to model: One fault breaks the series-chain and the whole unit can be considered failed. Test effectiveness, however, throws a twist to this. If a fault occurs in a section of the missile not susceptible to BIT, it will go undetected until that missile: experiences a fault that is detectable and is repaired (the assumption here is that depot repair processes will always catch defects that are undetectable by field test); undergoes a routine maintenance; or actual use (firing) is attempted.

Incorporated into the BIT common block is a modeling method for solving this problem by pre-assigning the dynamic object as being either BIT detectable or not BIT detectable. Then, if a fault occurs (fault modeling process detailed below) on a dynamic object that is marked as not BIT detectable, the weapon object is 1) marked as "failed", in a "God's-eye" attribute and 2) reinitialized with new failure variates and random BitDetectable attribute, and 3) the DutyCycle attributes are zeroed. If the dynamic object is attempted for use, its God's-eye attribute will be examined and it will fail launch. If it is tested again, it will pass, so long as none of its newly assigned TTF variates have been breached Also, this dynamic object that has a pre-existing fault that is not susceptible to BIT, because its BitDetectable attribute had been randomly reinitialized, has a positive probability of having yet another failure not susceptible to BIT. Finally, if the dynamic object undergoes scheduled or unscheduled maintenance, its Gods-eye attribute will be reset to an "un-failed" state. Dynamic objects that fail from the BIT common block relinquish a unit of resource from the RFI resource pool, and are time-stamped, so that after the dynamic object is repaired in the future, its downtime attribute can be augmented, facilitating accurate observations of operational availability (performed through the Observe Ao and Operational Availability common blocks).

This modeling process for test effectiveness, with this functionality for supporting availability calculation, modeled false alarm, and multiple TTF variates for multiple environment compared with multiple duty cycle accumulators, all combined in one portable block that can be pulled from a library and used anywhere required with the main model, makes for a very powerful weapon-hardware test modeling capability.

The BIT Test block is defined as follows:

| | |
|---|---|
| Inputs: | (1) dynamic object; |
| Function f( ): | Comparisons of TTF variate attributes with respective Duty Cycle attributes. Simple routing logic for False Alarm. Time stamping object and relinquishing RFI resource pool for weapon objects entering failed state |
| DO Manipulation: | Routing and attribute setting |
| Outputs: | (1) Un-failed dynamic object that has passed BIT (An effectively tested weapon) |
| | (2) Failed dynamic object that has passed BIT (An un-effectively tested weapon) |
| | (3) Un-failed dynamic object that has failed BIT (A false alarm) |
| | (4) Un-failed dynamic object that has passed BIT, but has an undetectable defect. |

Figure 14:
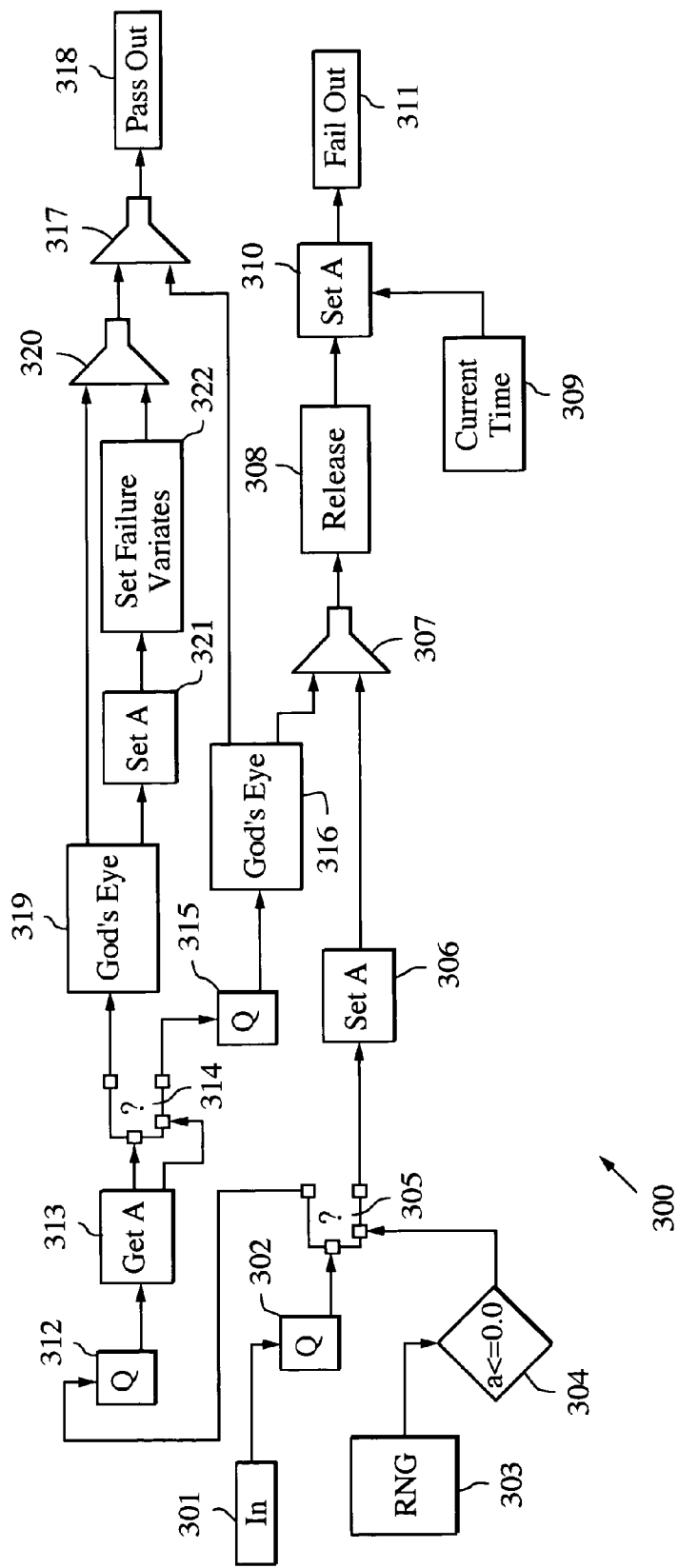
FIG. 14 is block diagram of the BIT common block.

As shown in FIG. 14, the Bit Test block 300 is implemented using a number of primitive blocks, two hierarchical blocks (H-blocks), and one embedded common block. The primitives used, the topology and the instruction set are determined by the simulation software and designer choice, other combinations may be equally effective. The dynamic object enters the block through object input Connector 301 and then into Queue primitive 302. All Queues primitives 302, 312 and 315 used in this block prevent the corruption of downstream data in cases where dynamic objects arrive simultaneously, by releasing dynamic objects one at a time through sections of the common block. The dynamic object is then subject to routing by a Select Output primitive 305, controlled by a Random Number Generator primitive 303 and Decision primitive 304. These three blocks 305, 303 and 304 work to emulate random false alarm events that, if determined as false alarm, will route the dynamic object to the bottom output of block 305. Objects routed thusly will be marked as false alarms by Set Attribute primitive 306, combined to another part of the network through Combine primitive 307, relinquish one unit of the RFI resource through passing through Release Resource primitive 308, time-stamped with current time System Variable primitive 309 and Set Attribute 310 before finally leaving this common block through (failed) object output Connector 311.

The BitDetectable attribute of dynamic objects leaving the top output of Select Output primitive 305 after passing through Queue primitive 312 will be read by Get Attribute primitive 313 and routed directly by the value of that attribute (0 or 1) using Select Output primitive 314. If the dynamic object was marked as detectable by BIT it is directed through Queue 315 into H-block 316, where its TTF Variate attributes are compared with respective Duty Cycle accumulators. Based upon this comparison dynamic objects are routed to either the Pass or Fail output of the God's eye H-block 316. If the object failed, it is routed to Combine primitive 307, Release (RFI) Resource 308, time stamped 309 and 310, and exits the block through (failed) Connector 311. If the dynamic object passed, it is routed to output Connector 318 after combining with another part of the network through Combine primitive 317.

Backtracking to Select Output primitive 305, the top output feeds non-detectable dynamic objects directly into God's eye H-block 319. Passed objects are directed to (passed) output Connector 318 after combining with two other parts of the network through two Combine primitives 320 and 317. Failed objects from H-block 319 leave the BIT test common block as "Passed" objects through the same blocks 318, 320 and 317, however not before they are marked as failed, from a God's eye perspective by Set Attribute primitive 321, and have their BitDetectable and TTF Variates re-initialized with embedded common block Set Failure Variates 322.

Warranty Check

The Warranty Check common block is designed to be used in conjunction with the BIT common block. It accepts weapon objects that have been determined by the BIT common block to have failed field BIT, and then, using dynamic object age, or accumulations of duty cycle accumulated in the Warranty Cycle attributes, compared with global warranty thresholds, the dynamic object is marked as being ether in-warranty or out-of-warranty. The power of this block stems from the capability to use multiple global thresholds and multiple Warranty Cycle attributes, and then, once configured for a specific warranty, to be inserted into the SUP topology wherever needed.

| The Warranty Check block is defined as follows: | |
| --- | --- |
| Inputs: | (1) Dynamic Object in failed state; |
|  | (2) Multiple Global Warranty Thresholds |
| Function f( ): | comparison between Warranty Cycle attribute and corresponding global warranty thresholds |
| DO Manipulation: | Attribute setting |
| Outputs: | (1) Dynamic object marked as either in warranty or out of warranty |

Figure 15:
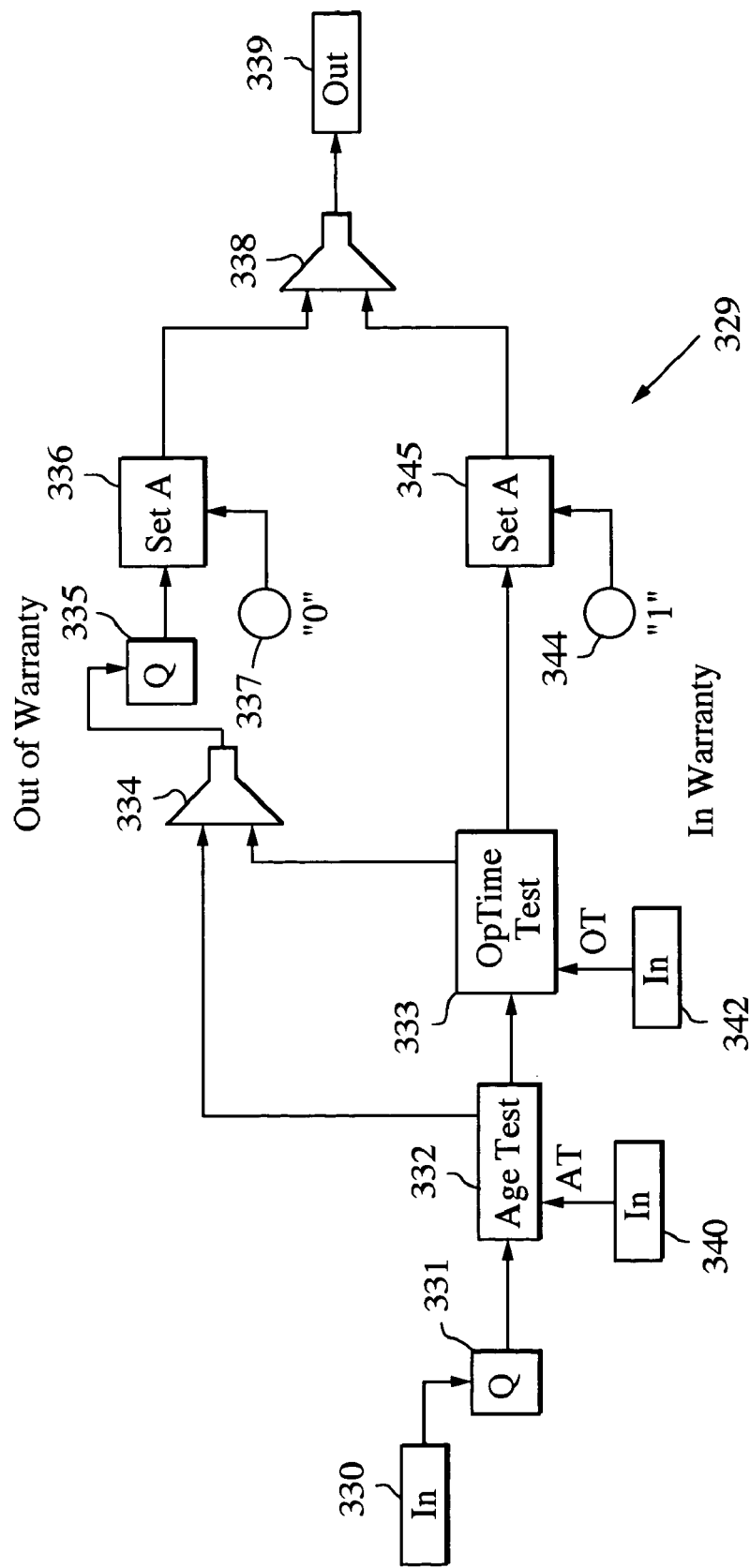
FIG. 15 is block diagram of the Warranty Check common block.

As shown in FIG. 15, the warranty check block 329 is implemented using primitive blocks and hierarchical blocks (H-blocks). The primitives used, the topology and the instruction set are determined by the simulation software and designer choice, other combinations may be equally effective. This block 329 is configured for two warranty thresholds, although it could be reconfigured for more or one. The dynamic object enters the block through object Connector 330, and then a Queue primitive 331. All Queue primitives 331 and 335 prevent the corruption of downstream data in cases where dynamic objects arrive simultaneously, by releasing objects one at a time through the sections of the common block. The first H-block encountered 332 tests the dynamic object's age against global threshold provide through value input Connector 340. If deemed still in warranty, the object is passed to the next H-block 333 where, similarly its operating WarrantyCycle attribute is compared with the corresponding global threshold provided through value Connector 342. If weapon is determined to be out of warranty by either H-block 332 and 333, it is passed out of the common block after combining to one path with Combine primitive 334, passing through Queue primitive 335, being marked as out of warranty with Set Attribute block 336, which is fed a constant 0 value by Constant primitive 337, combined to one output path with Combine primitive 338 and finally out of the common block through object output Connector 339. If the dynamic object is determined to be still in warranty after passing through H-block 333, it is sent to Set Attribute and Constant primitive combination 344 and 345 where it is marked, combined to one output path with Combine primitive 338 and finally out of the common block through object output Connector 339.

Parts Spares

Wherever repairs occur, spare parts are required. Rotable spares pools (pools of spare parts that are maintained at a set level) impact repair time delays of weapons, thus affecting operational and stockpile availability. The inclusion of spares pool modeling to the overall method adds great value. The Parts Spares common block integrates 1) modeling of fault isolation delay, 2) possible replenishment delays due to unavailability of spare parts and 3) removal and replacement (R/R) delay. The block uses a user-specified failure contribution distribution for parts or subsystems that comprise the whole dynamic object. The granularity of the decomposition is flexible. It contains resource primitives that emulate the actual spares pools, which require a "turnaround time" for replenishment to a specified level if ever drawn upon. This common block can be used anywhere in the main model wherever repair activity occurs.

| The Parts Spares block is defined as follows: | |
| --- | --- |
| Inputs: | (1) Dynamic object; |
|  | (2) Initial spares pool levels; |
|  | (3) Randomized spares pool replenishment times; |
|  | (4) Fault isolation and R/R time distributions and parameters |
| Function f( ): | Randomized decision based upon distribution of failure to parts of whole weapon object |
| DO Manipulation: | Routing based upon distribution of failure to parts of dynamic object. |
|  | Randomized time delays for fault isolation, R/R operation, possible further delay due to shortage of parts spare, |
| Outputs: | (1) Repaired dynamic object |
|  | (2) Queue statistics of possible delayed dynamic objects, waiting for specific spare parts; |
|  | (3) Spares pool utilization statistics |

Figure 16A:
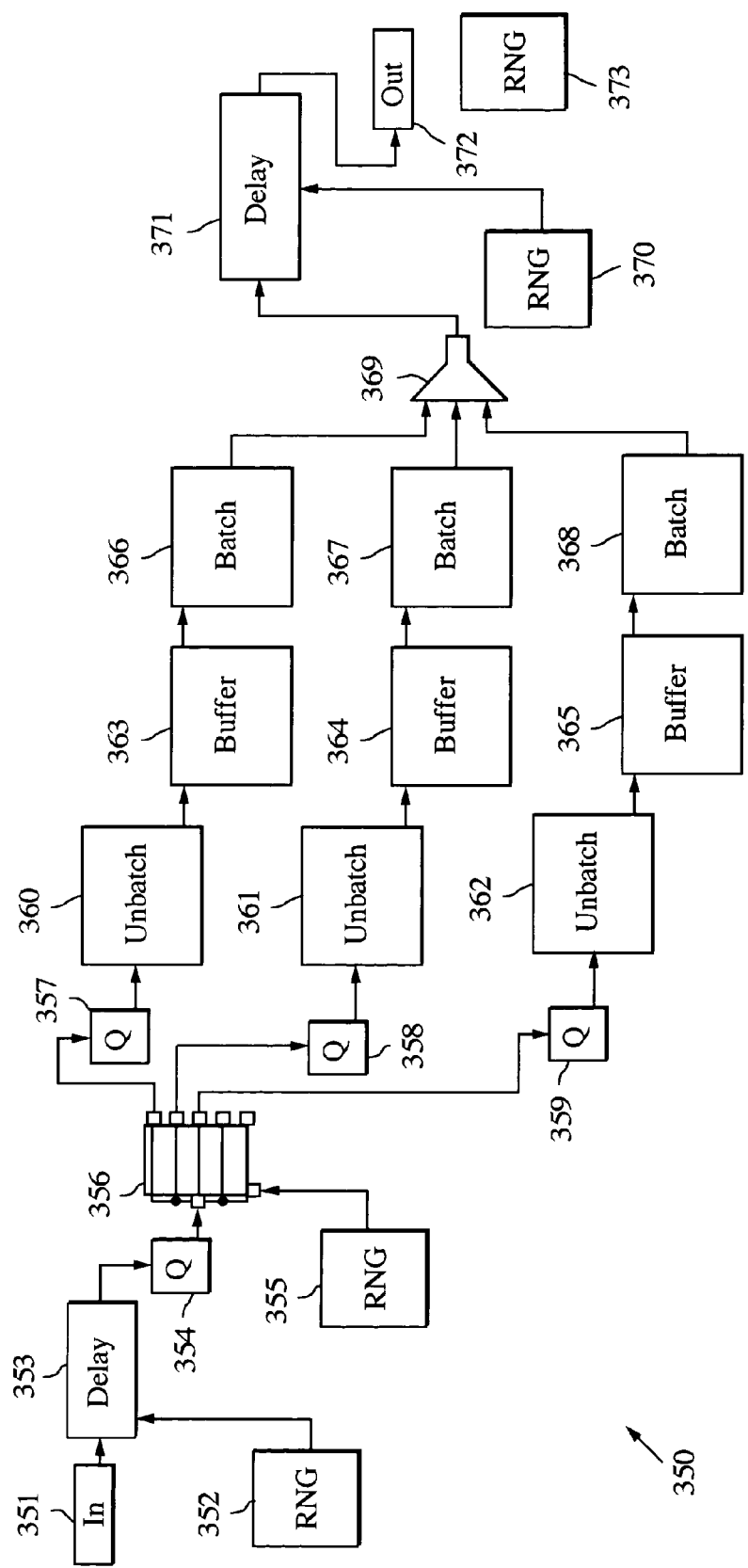
FIGS. 16a through 16c are block diagrams of the Parts Spares common block.
Figure 16B:
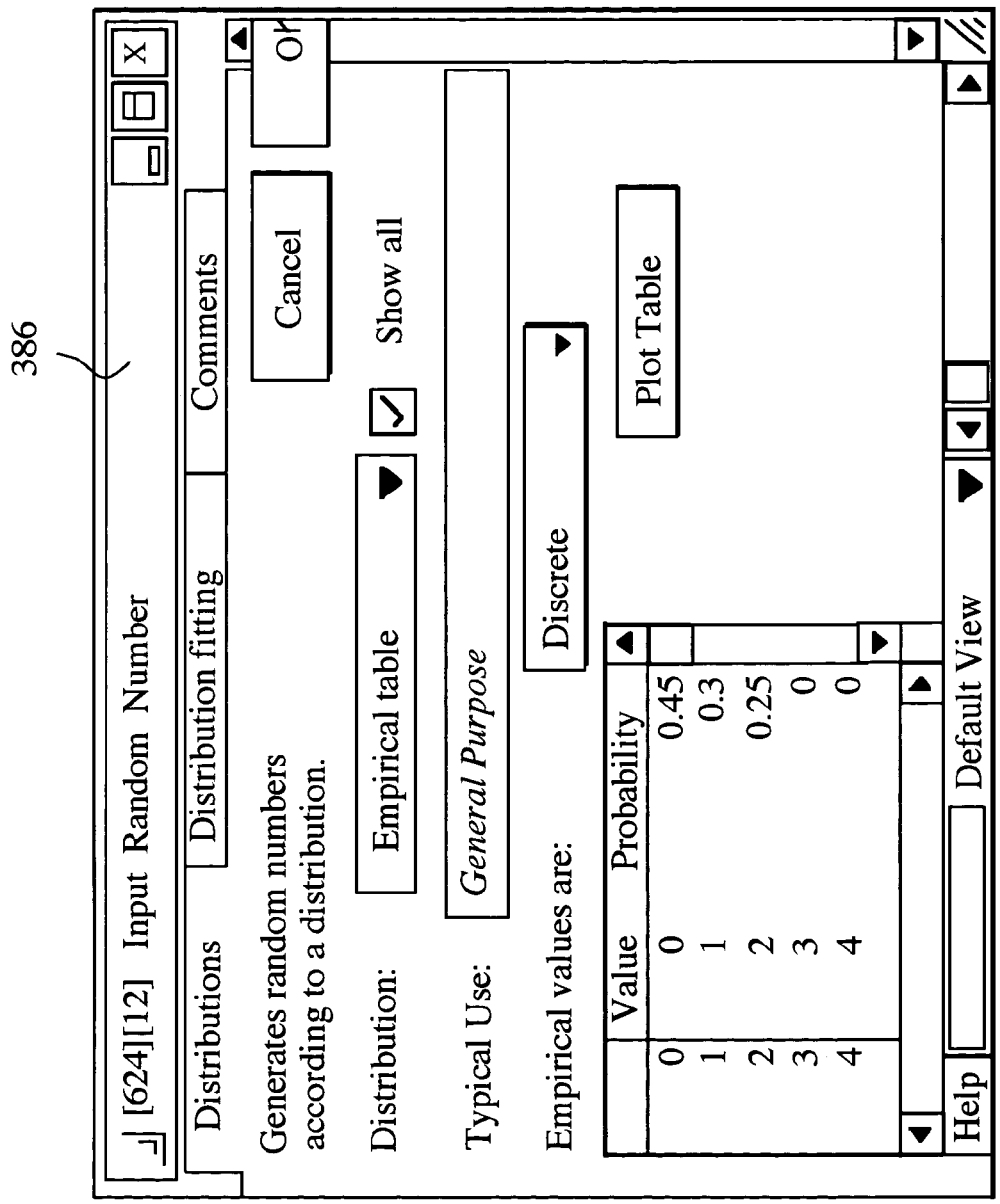
Figure 16C:
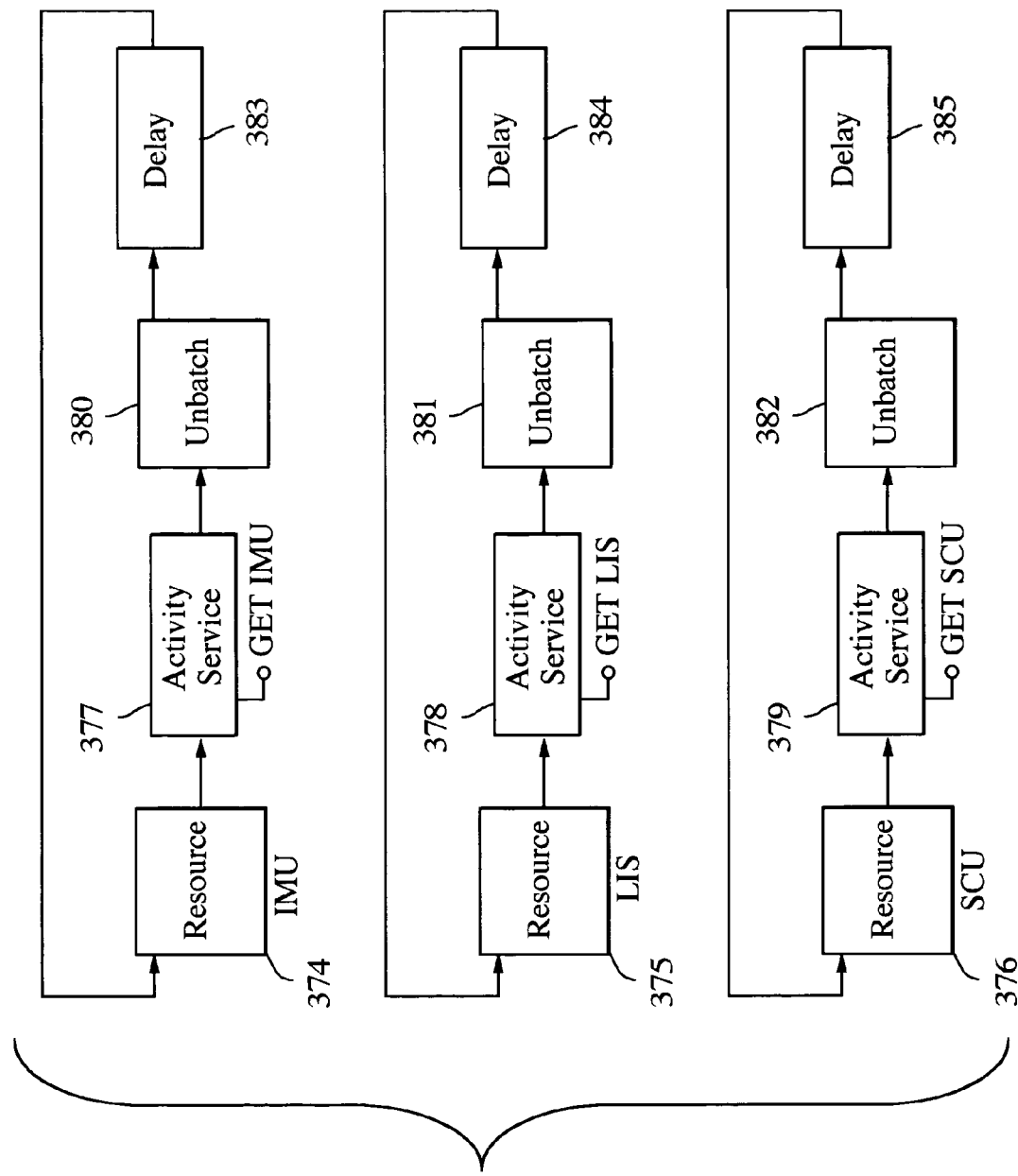

As shown in FIGS. 16a through 16c, the Parts Spares block 350 is implemented using a number of primitive blocks. The primitives used, the topology and the instruction set are determined by the simulation software and designer choice, other combinations may be equally effective. The dynamic object enters the block through object input Connector 351 and then into Activity Delay primitive 353 to emulate the time taken to fault isolate a weapon. This delay is randomized by Random Generator primitive 352, the distribution and parameters user specified. The dynamic object enters Queue primitive 354 preparing entry for Select Output primitive 356. This primitive is attached to Random Number Generator 355, which contains the distribution, set in dialog box 386, of failure to parts of the whole dynamic object. Dynamic Objects are randomly dispersed from primitive 356 in accordance with this distribution. Dynamic objects will enter either one of the Queue primitives 357, 358, 359 in preparation for entry into either of the Unbatch primitives 360, 361 and 362. These Unbatch primitives split the dynamic object, essentially creating a duplicate object. The duplicate objects are sent using the top connectors of the Unbatch primitives 360, 361 and 362, as units of parts demand to corresponding Activity Service primitives 377, 378, and 379. Activity Service primitives act as gates for the Resource primitives 374, 375 and 376, only allowing one unit to depart from the Resource primitives for every unit of demand received. The Resource primitives 374, 375 and 376 characterize the parts resource pools. Part dynamic objects released by either of the Activity Service primitives 377, 378, and 379 also split into two objects by Unbatch primitives 380, 381 and 382, one copy sent to one of the corresponding Batch primitives 366, 367 and 368, and the other copy fed to Activity Delay primitive 383, 384 and 385. These Activity Delay primitives randomly delay part objects according to Random Number Generator primitive 373 using user-specified distribution and parameters to emulate parts spars pool replenishment turnaround time, before being sent back to Resource primitives 374, 375 and 376.

The other copies generated from Unbatch primitives 360, 361 and 362 represent the dynamic objects. Dependent on the part they require for repair (implicit by the path they are on) they are sent to either of the Buffer primitives 363, 364 and 365. These Buffer primitives are possible bottleneck points, since the Batch primitives 366, 367 and 368 require one dynamic object for each of their input connectors in order for any object to continue. Given a spare available in corresponding Resource primitive 374, 375 and 376, corresponding Activity Service primitive 377, 378, and 379 and Unbatch primitives 380, 381 and 382, will send provide spare at either corresponding Batch primitive 366, 367 and 368. This will allow the weapon object to continue past 366, 367 and 368, otherwise, if an object is not immediately available in Resource primitives 374, 375 and 376, the dynamic object will be delayed in either of the corresponding Buffer primitives 363, 364 and 365. In either case, delay or no delay, once batched through either 366, 367 and 368, the weapon object is combined to all other paths with Combine primitive 369, randomly delayed with Activity Delay primitive 371 and Random Number Generator 370, with user specified R/R distribution an parameters, and then finally released from this common block through object output Connector 372.

Sub-Models

Figure 17:
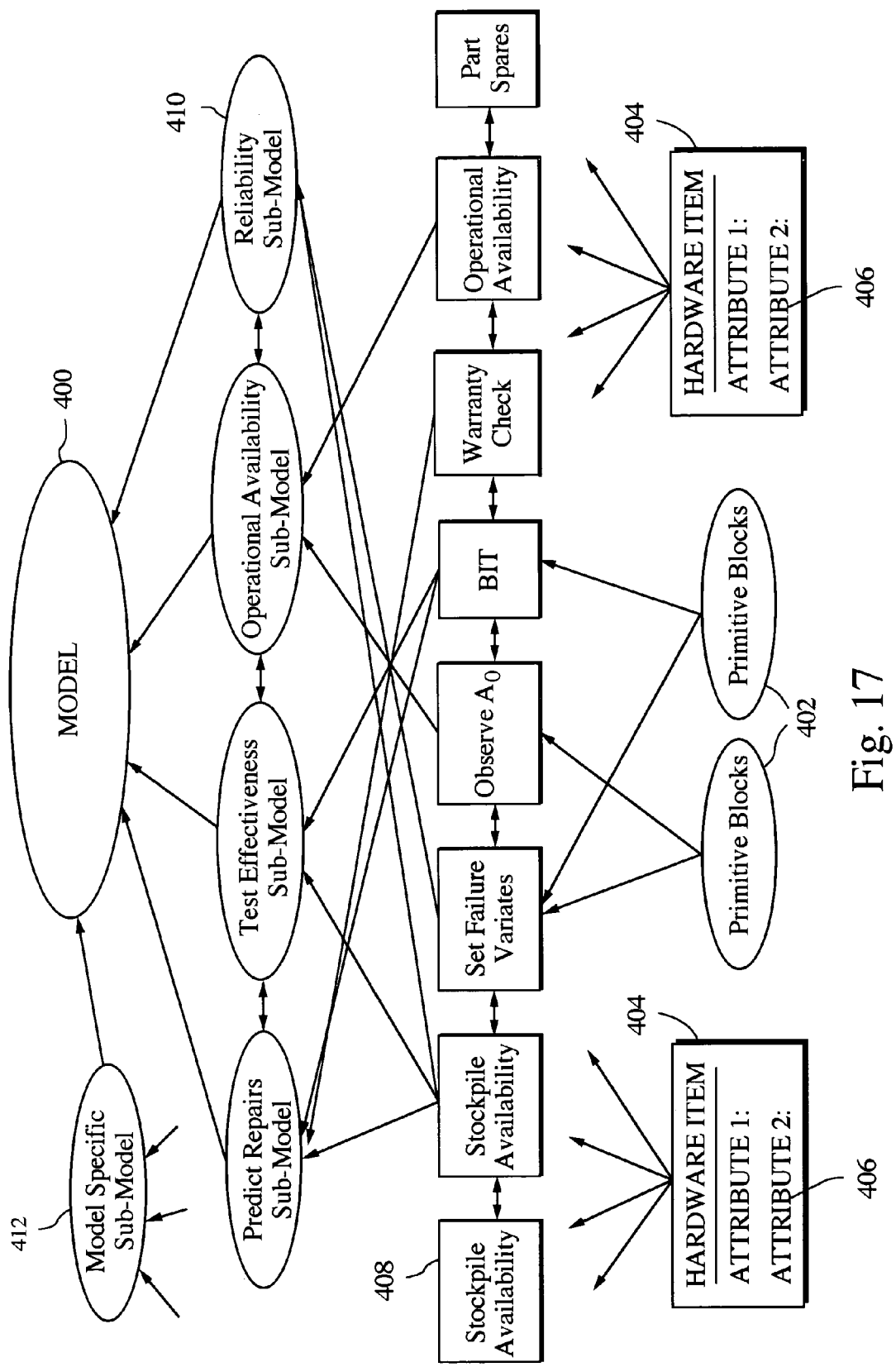
FIG. 17 is a hierarchical block diagram of a DES for a weapons system.

Sub-models provide an even higher level of pre-defined and pre-verified functionality through synergistic combinations of common blocks and common attributes. Sub-models are an arrangement of common blocks that provide elements of functionality to the main model. These "arrangements" of common block, although having definable patterns of topology, are flexible enough to be applied to most DES models of missile and missile defense system O&S process. As shown in FIG. 17, a model 400 includes a hierarchy of functional elements from the lowest basic primitives 402 to dynamic objects 404 having common attributes 406 to common blocks 408 and finally sub-models 410 from the library and model specific sub-models 412.

Test Effectiveness and Multiple Hardware Failure

The test effectiveness sub-model provides the capability of characterizing dynamic objects in a failed state that are not detectable through field BIT. This is useful in analyzing weapons systems because consideration of these dynamic objects will provide a more accurate assessment of the dynamic object population at the required time for actual operation (e.g., the population pre-launch reliability).

Figure 18:
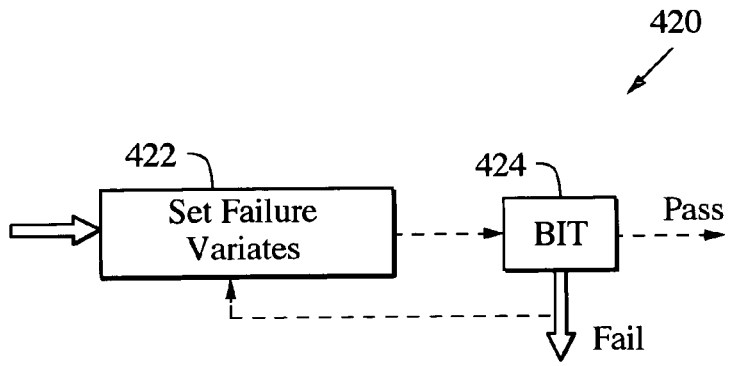
FIG. 18 is a block diagram of a Test Effectiveness and Multiple Hardware Failure sub-model.

The test effectiveness sub-model is defined as follows:
Common blocks: Set Failure Variates (SFA) and BIT.
Common Attributes: TTF Variates, BITDetectable, Duty Cycle
DO Manipulation: Resetting attributes As shown in FIG. 18, a test effectiveness sub-model 420 includes a Set Failure Variates common block 422 and a BIT common block 424. Within the SFA block 422, the BITDetectable Attribute is set from a binomial distribution as 0 (not detectible) or 1 (detectable). For example if Test Effectiveness is 95%, there is a 5% chance this attribute will be marked 0.

When a DO enters BIT block 424, the BitDetectible Attribute is read. If Not detectable, a "god's eye" comparison is made of the value of the TTF Variate attribute to the Duty Cycle attribute to determine whether the DO has failed. If yes, the random BitDetectible, TTF Variate and DutyCycle attributes of the DO are reset by the Set Failure Variates block 422 and the DO leaves the BIT block as a representation of weapon hardware with one fault that is not detectable by the test equipment. Since the TTF failure variate and DutyCycle attributes on this DO have been re-initialized, the DO-can fail again, and also with positive probability of going undetected. So it is possible for a DO to be subject to two or more failures as the simulation progresses. If detectable, the same "god's eye" comparison is made and the DO is either failed and reset or passed along.

Operational Availability

The operational availability sub-model provides a means for making single point observations of weapon downtime at various points within the model to maintain timely and accurate measurements of operational availability A0. This is useful in analyzing weapons systems because operational availability is a commonly desired metric for measuring the readiness of a weapon population.

The operational availability sub-model is defined as follows:
Common blocks: Observe $A_O$, Operational Availability.
Common Attributes: BirthDate, Downtime
DO Manipulation: Reading Downtime and BirthDate attributes only.

Figure 19:
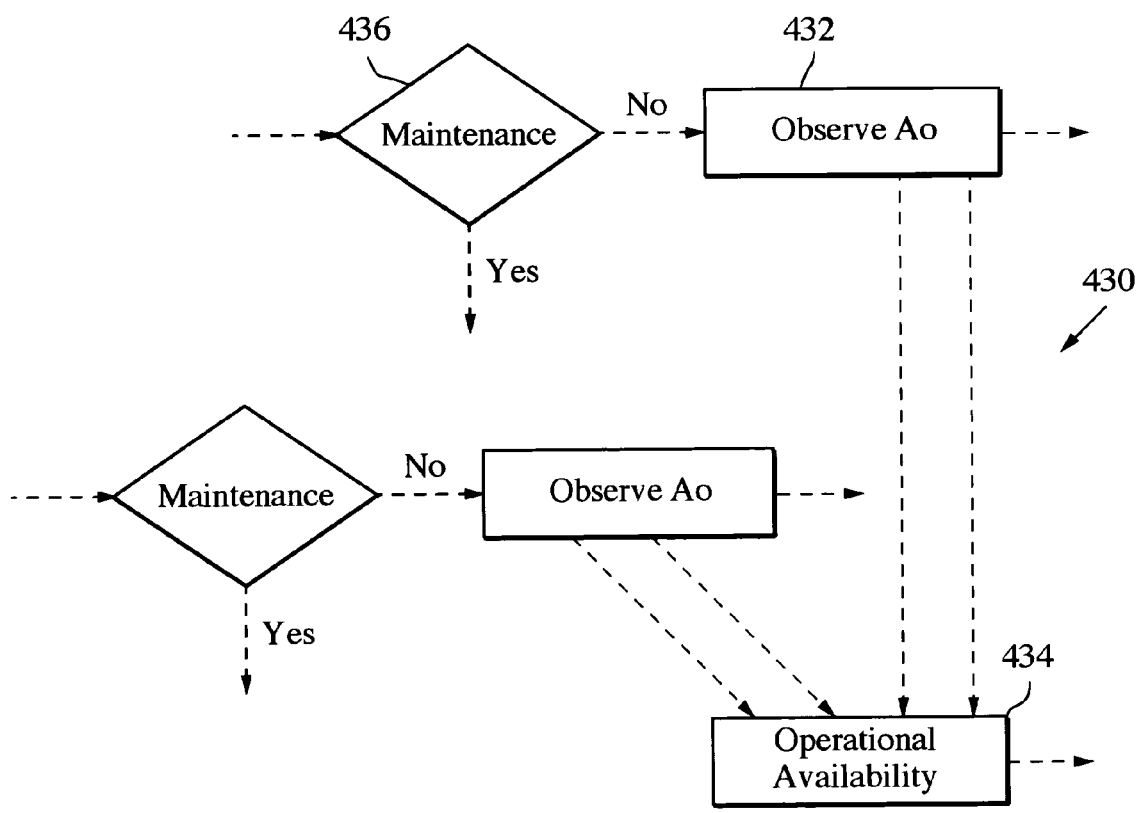
FIG. 19 is a block diagram of an Operational Availability sub-model.

As shown in FIG. 19, a test effectiveness sub-model 430 includes a plurality of Observe $A_0$ common block 432 placed logically with the SUP model and an Operational Availability common block 434. For example, placement at the output of a decision primitive 436 that determines whether a DO is due for scheduled maintenance or requires unscheduled maintenance due to a BIT failure is logical. If no maintenance is required, an observation is made. Otherwise, the DO is directed back for maintenance thereby incrementing its downtime. For every DO that enters an Observe $A_0$ common block, a single point observation is made of DO downtime paired with BirthDate. This information is input to the Operational Availability Block 434 where running averages of $A_0$ are calculated and reported.

Reliability Growth and Degradation

The reliability growth and degradation sub-model emulates how the failure rate of weapons can often improve as a weapon program matures and degrade as individual weapons age. This is useful in analyzing weapons systems because often with new weapon programs the phenomenon called reliability growth may occur. It may take months or even years for the failure rate to stabilize. This method facilitates not just the initial effects on availability, but also the prediction of warranted failures during that period. This enhanced prediction provides the means to accurately assess warranty risk. It is important to consider degradation of failure rate when dynamic objects age into wearout to predict when levels of availability for weapons will fall to unacceptably low levels as indicating when either demilitarization or Service Life Extension action should be taken.

The reliability growth and degradation sub-model is defined as follows:

Common blocks: Set Failure Variates, Service Life Check
Common Attributes: MTBF, TTF
DO Manipulation: Read/Write only As shown in FIG. 20, a reliability growth and degradation sub-model 440 includes a Delivery Primitive block 441, a Set Failure Variates common block 442 and a plurality of Service Life Check common block 444 placed logically within the SUP model. For example, placement at the output of a decision primitive 446 that determines whether a DO is due for scheduled maintenance or requires unscheduled maintenance due to a BIT failure is logical. To model the improvement in reliability as a weapons program matures, the MTBF initially increases as a function of lot or time. Therefore, when a DO is delivered the Delivery primitive block initializes, as a function of time or delivery lot, the DOs MTBF attribute. If all deliveries have been met, the Set Failure Variates block assigns the MTBF attribute a "current" MTBF value, normally the MBF of the last lot delivered. When the age of the DO exceeds a Service Life threshold, the MTBF will decrease as the DO continues to age.

Predict Repair Maintenance

The predict repair maintenance sub-model predicts the quantity and expected time, warranted and non-warranted weapon objects are returned for repair. This is very useful in analyzing weapons systems because it facilitates work-load planning, spares estimation and facility sizing, providing a valuable input for determining the Life Cycle Cost of the weapon system.

Figure 21:
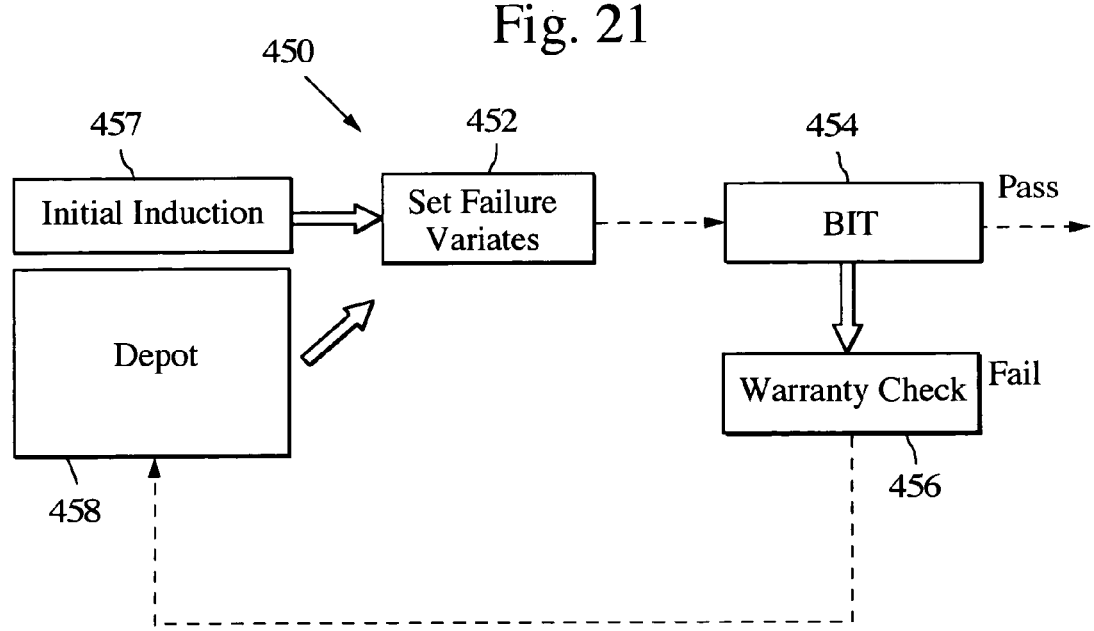
FIG. 21 is a block diagram of a Predict Repair Maintenance sub-model.

The predict repair maintenance sub-model is defined as follows:

Common blocks: Set Failure Variates, BIT and Warranty Check
Common Attributes: TTF, Duty Cycle, Warranty Cycle
DO Manipulation: Reading, Writing and Routing As shown in FIG. 21, a predict repair maintenance sub-model 450 includes a Set Failure Variates common block 452, a BIT common block 454 and Warranty Check common block 456. The initial delivery schedule 457 inducts the DO. The Set Failure Variates block defines TTF attributes. As the DO progresses during simulation, it passes through BIT blocks 454 periodically, according to pre-defined test policy. Failures from BIT are then marked in the Warranty Check common block as "in warranty" or "out-of-warranty" and return to the depot 458 for repair. The Set Failure Variates block resets the failure variate attribute when a DO returns from maintenance.

EKV Model & DES

The Exoatmospheric Kill Vehicle (EKV) is a very sophisticated payload for a booster rocket. The EKV's ultimate purpose is to protect large populations of human life from nuclear ballistic missiles directed at the United States and allies by rogue nations. The EKV is launched, on short notice, from a soloed booster, deployed from the booster above the atmosphere where it will track, discriminate, and destroy incoming nuclear payloads.

A life-cycle O&S model for the EKV was used to: (1) decide between two competing maintenance concepts A and B for the program, concepts that differ dramatically in cost; (2) quantify repairs of EKV payloads; and (3) identify major spares requirements for EKV payloads return. The population was scheduled to ramp-up and span a maximum 12.5 year lifetime. The SUP includes Original Issue, Initial Build-up, Booster Mate, Silo Emplacement, Periodic Test, Detected Failure, Preventive and Unscheduled Maintenance. Two Weapon Variants are characterized: Test-bed and $P^3I$. $P^3I$ Has Different MTBF, Different BIT policy, and no scheduled maintenance requirement whereas Test Bed variant requires periodic refurbishment. Available input metrics include failure rates & BIT effectiveness and MTBF data available for both dormant & operating environments for both Test Bed and $P^3I$. Desired output metrics include operational availability, stockpile availability, stockpile availability at the silo, repair prediction and spares requirements at the depot. The availability metrics provide a measure of the effectives of maintenance concepts A and B.

Maintenance concepts A and B differ primarily in where the excess payloads are stored and installed. As shown in FIG. 22a, concept A for EKV model 500 partitions the SUP process into three general locations: Facility 1, Facility 2 and Forward Location. EKVs are transported from Facility 1 to Facility 2 in accordance with scheduled deliveries 501 or after refurbishment/repair 502. Excess payloads are stored in a payload storage pool 503 at Facility 1. At Facility 2, the payload is built-up and mated to the booster 504 and transported to a silo 505 at the forward location. If a deployed payload fails, the boosters is removed from the silo, broken down at Facility 2 506 and a replacement payload is transported to Facility 2 for build-up and booster mate 504. The defective payload is returned to Facility 1 for refurbishment or repair. As shown in FIG. 22b, the payload storage pool 507 located at the Forward Location. Implicit in concept B is equipment and infrastructure for removing and replacing payloads from the boosters while they are in the silo. Therefore the De-mate and Breakdown activity 506 in concept A is absent from concept B. This is a more expensive alternative but is more reduces replacement delay. The computer model is designed to switch between these concepts for easy comparison of the effect changing concepts on operational, stockpile and silo availability.

Figure 23:
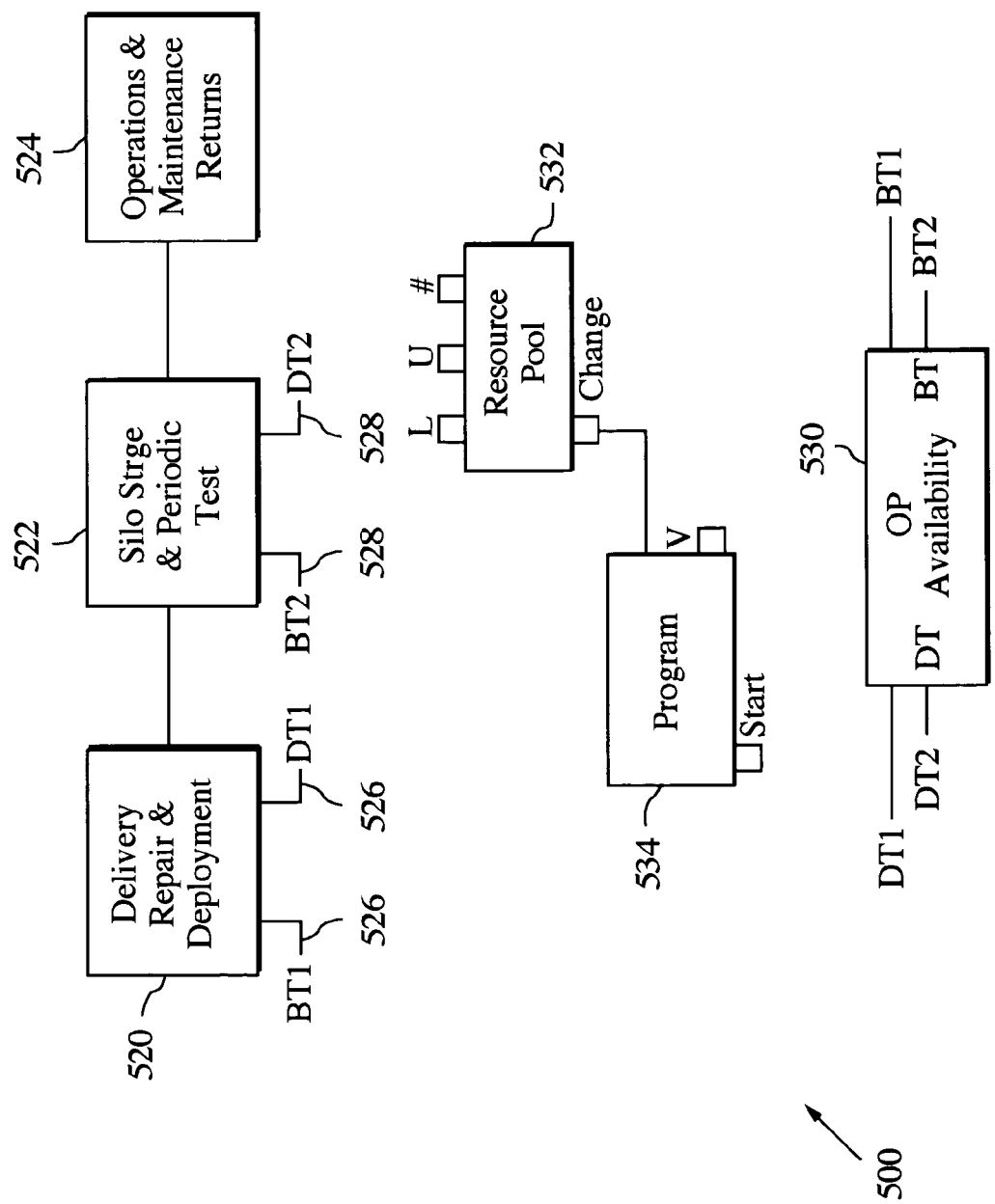
FIG. 23 is a block diagram of the EKV model.

As shown in FIG. 23, the EKV O&S Simulation Model 500 is organized into three high level hierarchical blocks (H blocks): (1) Delivery, Repair & Deployment 520; (2) Silo Storage and Periodic Test 522; and (3) Maintenance Returns 524. The primary category of dynamic objects manipulated in the model represent EKV payloads as described above and are referred to as Payload Dynamic Objects (PDOs). H blocks 520 and 522 pass values of the Birth Date and Down Time attributes 526 and 528 to an Operational Availability common block 530 to calculate operational availability $A_O$. This block may be simplified because of the comparatively low population of PDOs (hundreds, not thousands). There is no need to group the observations to save computer memory, and therefore no need for weighted averages to account for different group sizes and no need for a count of observations passed to the block. A Resource Pool primitive 532 represents the silo where deployed PDOs will be stored at ready. The capacity for this Resource Pool primitive is dynamically controlled with a connected Program primitive 534. During simulation the Program primitive can schedule PDOs as input to the capacity connector of the Resource Pool primitive, thereby emulating the actual activation of new silo sites, scheduled years into the future.

Figure 24:
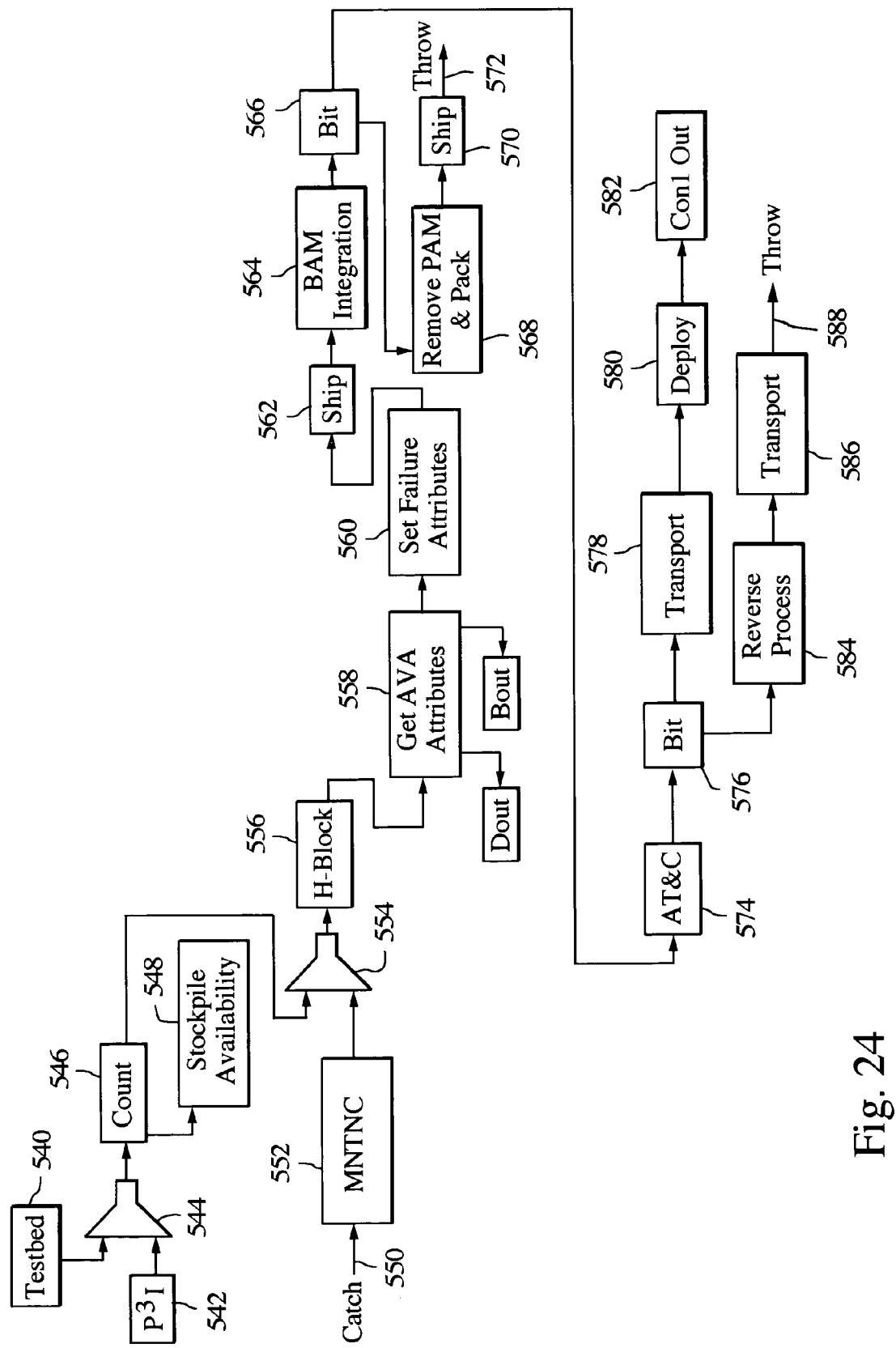
FIG. 24 is a detailed flow diagram of the Delivery Repair & Deployment H-block

As shown in FIG. 24, Delivery, Repair & Deployment H-block 520 generates Test Bed PDOs and optional $P^3I$ PDOs according to schedule from H blocks 540 and 542, respectively. These H blocks define the TTF variant and MTBF common attributes to identify and characterize the different failure rate for the two EKV payload variants. PDO variants are combined to one path through Combine primitive 544 and then counted through Count primitive 546. This count updates the Number Delivered, Nd, input to the Stockpile Availability common block 548. A Catch primitive 550 and a Maintenance H block 552 receive PDOs for repair and reissue them for delivery. A combine primitive 554 combines both the newly issued PDOs and the PDOs reissued from maintenance.

The PDOs enter an H-block 556 in which they enter a global RFI resource pool and the Duty Cycle and other attributes are zeroed and initialized. A Get AVA Attributes block 558 reads the DownTime and BirthDate attributes. A Set Failure Attributes common block 560 assigns TTF attributes to the PDO according to their pre-defined MTBF attributes and randomly determines the PDO BitDetectable attribute. A Ship H block 563 represents a random transport delay for PDOs being transported to a BAM integration facility block 564 where the PDO experiences another random delay, characterizing hardware build-up operation of the EKV payload. A BIT common block 566 passes or fails the PDO, accounting for test effectiveness of the PDO and false alarm. PDOs that fail BIT undergo reverse processing in Remove PAM & Pack H block 568, undergo random lay in Ship H block 570, and are globally transferred using Throw primitive 572 to Catch primitive 550 for maintenance and reissue.

If the PDO passes, it moves to an AT&C facility H block 574 for more build-up operations. Within the AT&C block 574, the global Silo Resource pool is examined to determine if there is a demand. If there is not a demand (i.e., the Silo is full), then Testbed variant PDOs are stored in a resident Queue primitive, representing a storage facility not in the proximity of the silo, until needed. $P^3I$ variants, however, are transported using a resident Delay primitive to the Silo location and stored in another Queue resident in the AT&C block 574, said Queue representing a storage facility in the proximity of the silo. If a PDO is required from the silo, and a $P^3I$ PDO is available, it is globally transferred to the Operations & Maintenance Returns H-block 524 in FIG. 23. If a $P^3I$ PDO is not available, but a testbed PDO is, the testbed PTO exits the AT&C block, is tested in BIT common block 576, and if passed is transported and deployed through H blocks 578 and 580, respectively, and finally exits the encasing block through output Connector 582 to the Operations & Maintenance Returns H-block 524. If the testbed PDO fails the BIT 576, it undergoes reverse processes 584, transport delay block 586, and is globally transferred using Throw primitive 588 to Catch primitive 550 for maintenance. If there is a demand at the silo and both testbed and $P^3I$ PDOs are available, they are randomly selected.

PDOs are globally sent from other parts of the model for maintenance to the Catch block primitive 550 and into the Maintenance H-block 552. Within this H block, PDOs undergo refurbishment or repair processes, depending on their state as indicated through attribute values. There is an embedded spares common block that is configured for eight spares pools. Maintenance job queue statistics are reported from this block to the interface.

Figure 25:
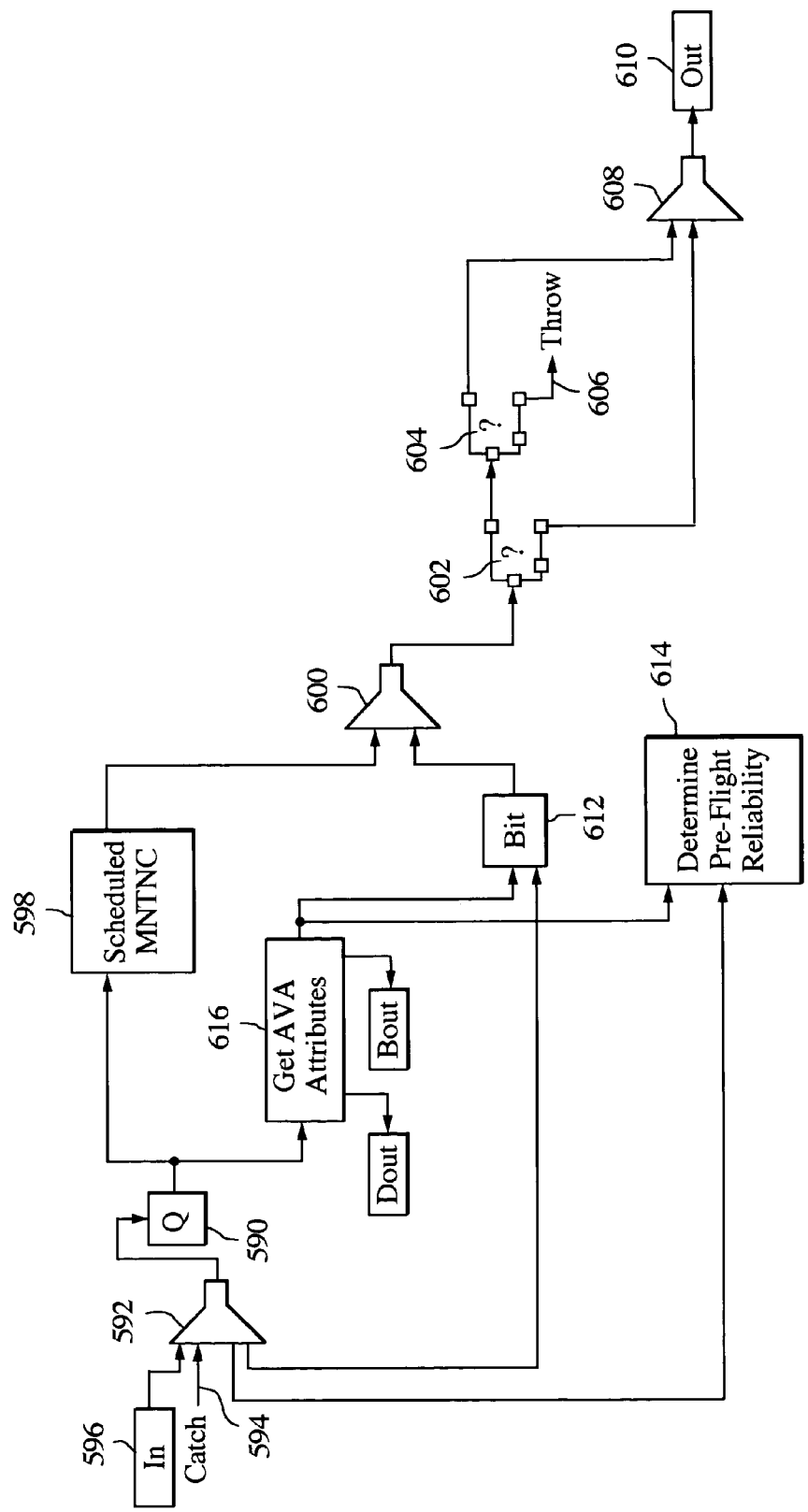
FIG. 25 is a detailed flow diagram of the Silo Storage and Periodic Test H-block.

As shown in FIG. 25, Silo Storage and Periodic Test H-block 522 includes a Queue primitive 590 that represents the physical silo storage. PDOs enter the queue via a Combine primitive 592 that combines PDOs that enter either through a Connector 594 or globally from a Catch primitive 596. A Scheduled MNTNC Check H block 598 periodically pulls Testbed PDOs from Queue primitive 590, and examines Testbed PDOs individually to see if they are due for scheduled maintenance. Those that are not due are globally transferred to Catch primitive 596, through combine 592 and back into silo Queue 590. Within Scheduled MNTNC Check H block 598, those Testbed PDOs that are due for maintenance relinquish both Silo and Stockpile availability resource pools and are passed through Combine primitive 600 to Select Output primitive 602.

If the model is set for maintenance concept B, the PDO will take the top path of the Select Output block 602 and enter another Select Output primitive 604. If a PDO spare is available, as indicated through the connector attached to this primitive, the PDO is sent to the bottom output and globally transferred with the Throw primitive 606 to a Catch primitive 622 encased in the Operations & Maintenance Returns H-block 524 detailed in FIG. 26 below. If no spare is available it passes out of the encasing block through Combine primitive 608 and Connector 610. If the model is in maintenance concept A mode, the PDO will simply exit through the bottom path of Select Output block 602 and Combine primitive 608 and Connector 610.

Similar to Scheduled MNTC Check 598, BIT common block 612 and Determine Pre-flight Reliability H block 614 periodically pull (according to set schedules) PDOs from the silo Queue 590. The opportunity is taken to read the PDOs Downtime and BirthDate attributes for Operational Availability observations in common block 616. PDOs that pass BIT are globally transferred to Catch block 594, through Combine block 592 and back to silo Queue 590. PDOs that fail BIT are passed to Combine primitive 600, and processed as described above. The Determine Pre-flight Reliability H block 614 periodically pulls (according to set schedule) PDOs from the silo, examines, calculates and reports pre-flight reliability.

As shown in FIG. 26, in the Operations and Maintenance Returns H-block 524 PDOs will only enter through a Connector primitive 620 if the model is in maintenance concept A mode. If the model is set to maintenance concept B mode, PDOs enter globally through Catch block primitive 622 and are processed in Preferred Option Ops H block 624. Within this block, a demand signal is sent globally to the AT&C common block (FIG. 24, block 574) thereby immediately releasing a replacement PDO spare. The original PDO due for maintenance undergoes removal operations directly from the silo. In the meantime the replacement PDO will arrive to Preferred Option Ops H block 624, after a short transport delay, and will undergo replacement delay for emplacement into silo. The PDOs are combined to one output path through a Combine primitive 626, undergo shipment preparation delays in H block 628, transport delays in H block 630 and then are globally transferred via Throw block 632 back to Delivery Repair & Deployment H block (FIG. 24 Catch block 550).

An example of an interface 640 for use with the EKV O&S simulation is shown in figures in 27a and 27b. These input and output elements are direct pointers to fields from selected primitive blocks in the model. They provide ease of use for all users of the EKV O&S Simulations and allow immediate and timely comparison of meaningful statistics. Although the set of outputs here were deemed the most important, they are only a subset of all outputs that can be obtained from the model. For example, throughputs at all the various facilities in the modeled SUPs could have been reported as well. The input fields of the interface allow easy "what if" analysis.

Figure 27A:
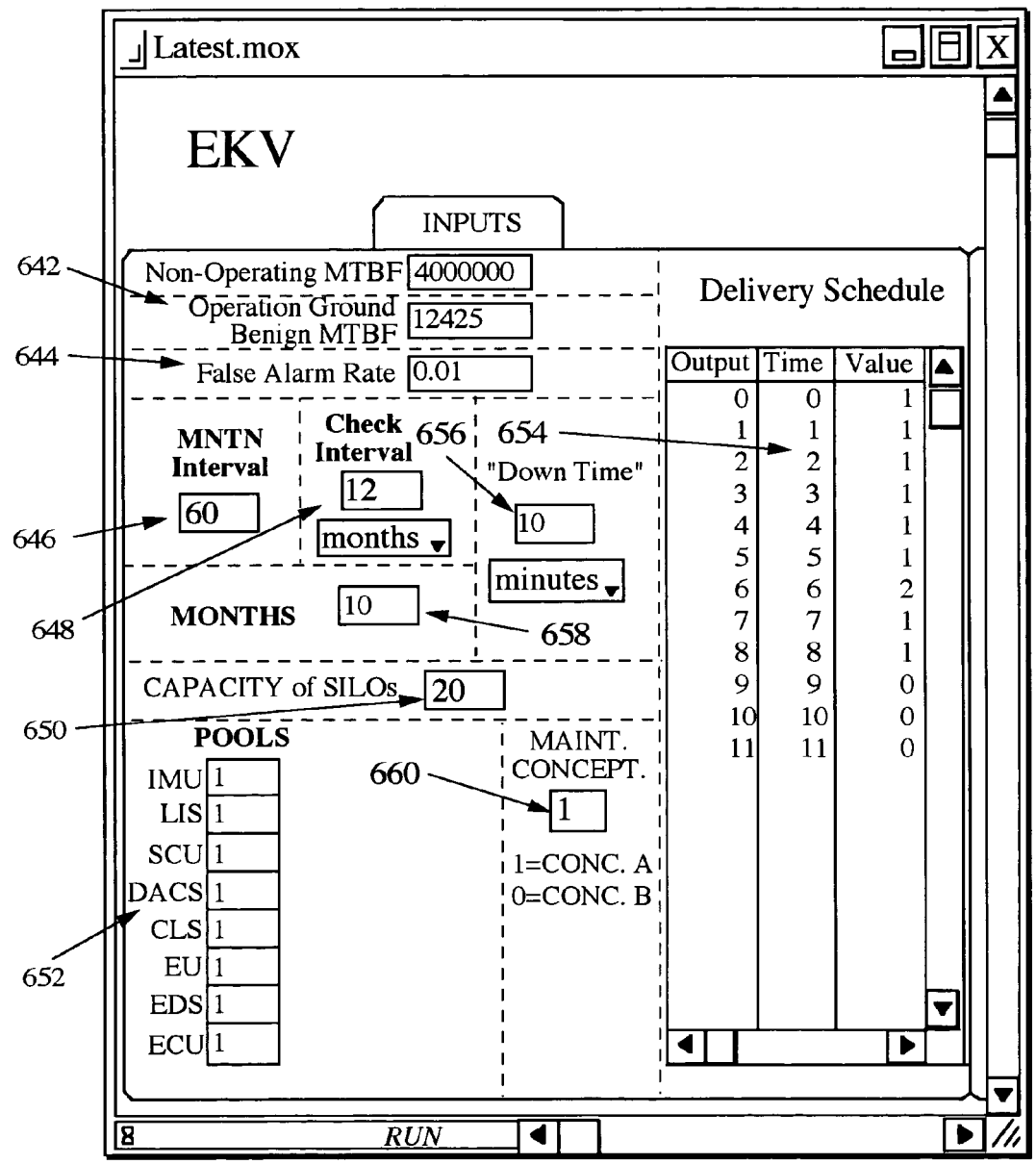
FIGS. 27a and 27b are views of input and output interfaces for the EKV model.
Figure 27B:
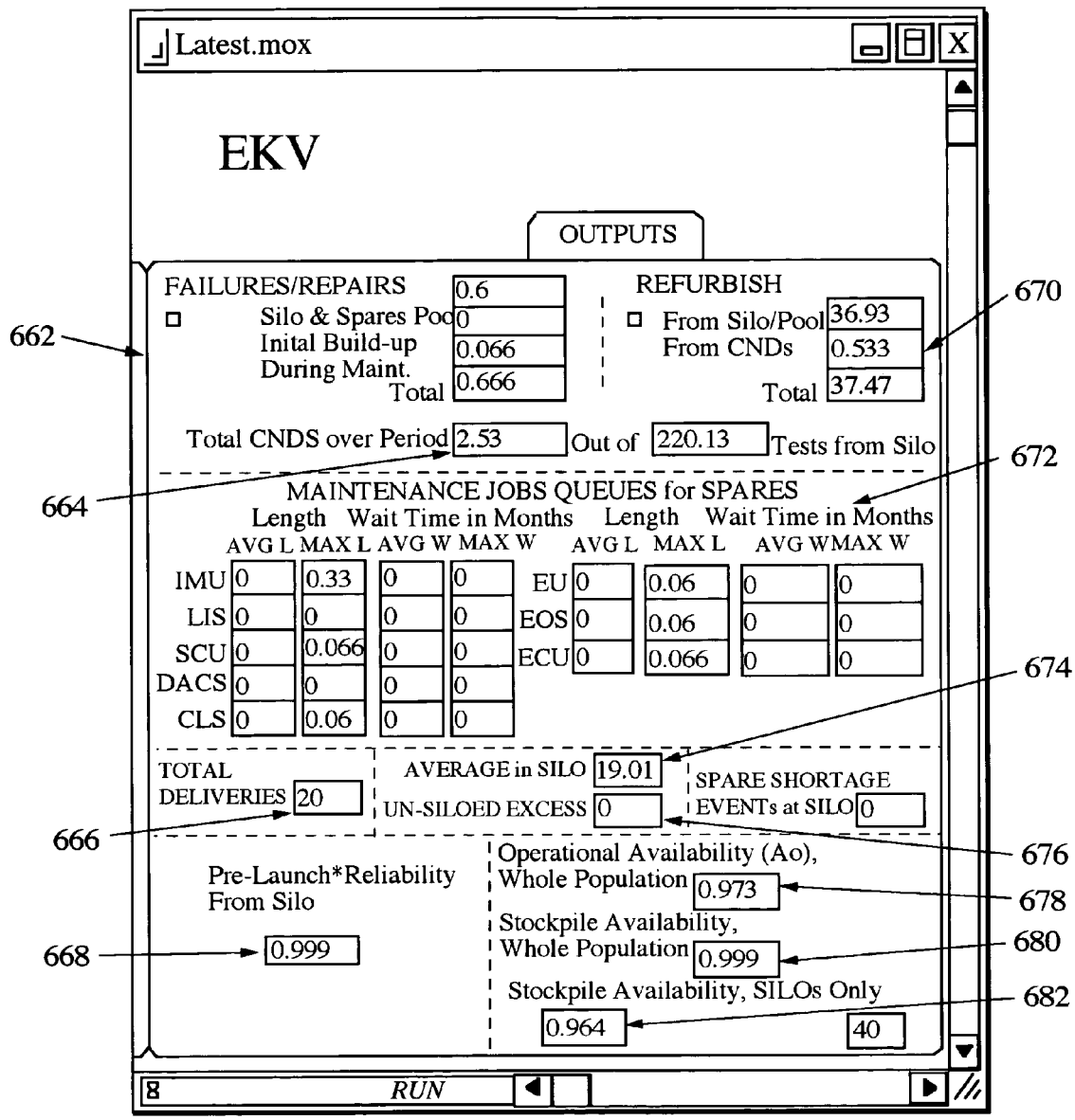

As shown in FIG. 27a, the inputs include reliability input 642 for specifying the operating and non-operating MTBF, a false alarm rate 644, a scheduled maintenance frequency 646, a test frequency 648, a deployment capacity 650 (number of silos), parts spares pool levels 652, a delivery schedule 654 (time at which dynamic objects are inducted into the support system), a test time 656, a maintenance ground rule 658 and an interface switch 660 for choosing between maintenance concepts A and B. As shown in FIG. 27b, the outputs include the quantity of failures 662 detected at the silo, initial build-up and during maintenance, a number of "can not duplicates" (field false alarms) 664, an echoed input 666, a reliability of deployed weapons 668 accounting for delays and duty cycles imparted through the modeled system, a number of scheduled maintenance actions 670 from silo/pool and can not duplications, queue statistics 672 showing any significant delays of maintenance activity due to lack of spare parts or sub-assemblies, an average number of weapons that can be sustained "at ready" for deployment 674, excess weapons in storage 676 and the operational availability 678, stockpile availability 680 for the whole population and stockpile availability 682 for the silos only. By varying the inputs, a user can immediately see the effects on critical outputs.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A computer-implemented discrete event simulation (DES) system for the operations and support (O&S) problem of a weapons system, said DES system comprising:
    a plurality of dynamic objects having attributes that represent characteristics of weapons, said attributes having local values that define a local state of each dynamic object;
    a plurality of static objects having data that is global with respect to the dynamic objects and functional operators, at least some of which are probabilistic;
    a network of said static objects that are organized in accordance with a service use profile (SUP) to calculate a time-based prediction of weapons stockpile and operational availability, maintenance activities, and spare parts stock over a life cycle of the weapons system, said network having a global state; and
    a simulation engine that advances to the next change of said local or global states whereat said static objects read and write said attributes in accordance with their functional operators and global data and update the time-based prediction of weapons stockpile and operational availability, maintenance activities, and spare parts stock as the dynamic objects traverse the network, said DES displaying the results of the simulation including the time-base prediction of weapons availability, maintenance activities and spare parts stock to a user through an interface to maintain an inventory of said weapons over the life cycle of the weapons system.

2. The computer-implemented DES system of claim 1, wherein said attributes include a plurality selected from Birth Date, TTF variate, Duty Cycle, Warranty Cycle, Down Time, MTBF, BitDetectable, GodsEye and Weapon Variant common attributes.

3. The computer-implemented DES system of claim 2, wherein said common attributes include said MTBF, TTF variate and Duty Cycle each of which have a plurality of local values corresponding to different environments.

4. The computer-implemented DES system of claim 1, wherein the simulation calculates a time-based prediction of warranted and not warranted maintenance activities.

5. The computer-implemented DES system of claim 1, wherein the static objects comprise a plurality of primitive blocks and a plurality of common blocks that are organized in accordance with the SUP, said DES system including a library of common blocks including BIT, Stockpile Availability, Observe $A_0$, Operational Availability, Warranty Check, Set Failure Variates, Service Life Check and Parts Spares, wherein said network includes at least one said common block to support the calculation of the time-based predictions.

6. The computer-implemented DES system of claim 5, wherein said common blocks have common attributes including Birth Date TTF variate, Duty Cycle, Warranty Cycle, Down Time, MTBF, BitDetectable, GodsEye and Weapon Variant.

7. The computer-implemented DES system of claim 5, comprising a library of sub-models including Test Effectiveness and Multiple Hardware Failure, Operational Availability, Reliability Growth and Degradation, and Predict Repair Maintenance, wherein the network comprises at least one sub-model to calculate the time-based predictions.

8. The computer-implemented DES system of claim 1, wherein the plurality of the static objects comprise primitive blocks and common blocks, said common blocks including Set Failure Variates and BIT and at least one of Stockpile Availability, Observe $A_0$ and Operational Availability, Warranty Check, Service Life Check and Parts Spares, said dynamic objects having common attributes including at least Duty Cycle, TTF variate, BitDetectable, GodsEye, and MTBF.

9. The computer-implemented DES system of claim 8, wherein the included Stockpile Availability block calculates a measure $A_s$ of the percentage of weapons in a stockpile that are ready for issue (REI) as $A_s =\text{REI}/(Nd-\text{Att})$ where Nd is the numbered delivered to the stockpile up to a point in time and Att is the attrition up to a point in time.

10. The computer-implemented DES system of claim 9, wherein the measure $A_s$ is a numbers-based running average.

11. The computer-implemented DES system of claim 8, wherein said Set Failure Variates block uses the MTBF as an input to randomly generate a value for the TTF attribute and randomly generates either a 0 or 1 for the BitDetectable attributes based on an overall test effectiveness probability.

12. The computer-implemented DES system of claim 11, wherein said Set Failure Variates block reads a plurality of MTBF attributes of one dynamic object corresponding different environments to calculate a plurality of associated TTF attributes of one dynamic object for the different environments.

13. The computer-implemented DES system of claim 12, wherein the MTBFs increase as the weapons system matures but decrease as individual weapons age beyond their service life.

14. The computer-implemented DES system of claim 8, wherein said dynamic objects further includes Birth Date, common attributes, said included Service Life Cheek block using the Birth Date attributes and a Current Time primitive to calculate the age of the dynamic object and compare it to a service life, and if the age is greater than the service life either take the dynamic object out of service or utilize degraded MTBF to recalculate TTF attributes as a function of its age.

15. The computer-implemented DES system of claim 14, wherein the MTBF and TTF attributes increase as the weapons system matures but decrease as individual weapons age.

16. The computer-implemented DES system of claim 8, wherein said dynamic objects further include Birth Date and Down Time common attributes, said included Observe $A_O$ block calculating a single point estimate $A_OS$ of $A_O$ as $A_OS=1$ −Down Time/(CurrentTime−Birth Date) where CurrentTime is a current time and a count of the number of observations to date.

17. The computer-implemented DES system of claim 16, wherein the included Operational Availability block calculates a running average $A_O$ from a plurality of single-point estimates $A_OS$ observed at different points in the network weighted by a cumulative number of observations for each estimate.

18. The computer-implemented DES system of claim 8, wherein said BIT block performs a sequence of logical operations on the dynamic object to determine whether a false alarm failure occurs, whether a failure is detectable by the value of the BitDetectable attribute and whether the dynamic object's Duty Cycle is greater or less than its TTF.

19. The computer-implemented DES system of claim 18, wherein the BIT block generates one of the following outputs: (1) Un-failed dynamic object that has passed BIT, (2) Failed dynamic object that has passed BIT, (3) Un-failed dynamic object that has failed BIT; and (4) Un-failed dynamic object that has passed BIT, but has an undetectable defect.

20. The computer-implemented DES system of claim 18, wherein said TTF and Duty Cycle attributes have a plurality of values for different environments.

21. The computer-implemented DES system of claim 8, wherein said dynamic objects further include Warranty Cycle common attributes that accumulates time or cycles, said included Warranty Check block checking the Warranty Cycle attribute against a warranty threshold for a failed dynamic object and indicating the failed dynamic object as warranted or not warranted.

22. The computer-implemented DES system of claim 21, wherein said warranty threshold and said Warranty Cycle attribute have a plurality of values for different environments.

23. The computer-implemented DES system of claim 8, wherein said dynamic objects have a plurality of failure modes that require different parts spares, said included Parts Spares block calculating a time delay for a failed dynamic object by calculating a random fault isolation delay, calculating the maximum replenishment delay for the multiple failure modes and calculating a random removal and replacement delay.

24. The computer-implemented DES system of claim 23, wherein dynamic objects resident to said Parts Spares Block represent rotable pools of available spare parts and which, when decremented, become unavailable as a spare to said dynamic objects entering the Parts Spares Block, requiring a time delay to be made available.

25. The computer-implemented DES system of claim 24, wherein said entering dynamic objects may experience delay due to unavailability of said resident dynamic objects, where delayed dynamic objects are held in a queue primitive providing delay time information.

26. The computer-implemented DES system of claim 24, wherein said resident dynamic objects are held in a resource primitive block when available to provide utilization information.

27. The computer-implemented DES system of claim 24, wherein a plurality of resident dynamic objects represent a plurality of failure modes for said dynamic objects entering Parts Spares Block.

28. The computer-implemented DES system of claim 8, wherein the network comprises at least one sub-model to calculate the time-based predictions, said sub-model comprising a plurality of common blocks having a relational topology and instruction set to perform a common function.

29. The computer-implemented DES system of claim 28, wherein a Test Effectiveness sub-model comprises a the BIT common block that checks the BitDetectable attribute and compares the Duty Cycle to the TTF attribute to determine whether a dynamic object has failed and, if so, the Set Failure Variates common block resets the TTF, BitDetectable, and DutyCycle attributes.

30. The computer-implemented DES system of claim 28, where said dynamic objects further include Birth Date and Down Time common attributes, an Operational Availability sub-model comprising a plurality of Observe $A_O$ blocks at different points in the network, each block calculating a single point estimate $A_OS$ of $A_O$ as $A_OS=1$ −Down Time/ (CurrentTime−Birth Date) where CurrentTime is a current time and recording a number of observations to date, and an Operational Availability block that calculates a running average $A_O$ from the plurality of single-point estimates $A_O$ S weighted by the cumulative number of observations for each estimate.

31. The computer-implemented DES system of claim 28, wherein a reliability growth and degradation sub-model comprises a Delivery primitive block that initializes the MTBF attribute, the Set Failure Variates block that randomly generates a TTF attribute and a plurality of Service Life Check blocks throughout the network that compare the age of the dynamic objects to the TTF attribute to pass or fail the dynamic object.

32. The computer-implemented DES system of claim 28, wherein said dynamic objects further include Warranty Cycle common attributes, said Predict Repair Maintenance sub-model comprising the Set Failure Variates block that initializes the TTF attribute, the BIT block that tests the accumulated Duty Cycle against the TTF attribute to pass or fail the dynamic object, and a Warranty Check block that compares the Duty Cycle to the Warranty cycle to determine whether the failed dynamic object is warranted or not-warranted.

33. The computer-implemented DES system of claim 1, wherein the SUP describes a logical structure of delivery, maintenance, deployment and testing policy and infrastructure and logistics constraints.

34. A computer-implemented discrete event simulation (DES) system for the operations and support (O&S) problem of a weapons system, said DES system comprising:

a plurality of dynamic objects having Birth Date, Time-to-Failure (TTF) variate, Duty Cycle, Warranty Cycle, Down Time, MTBF, BitDetectable, GodsEye and Weapon Variant common attributes that represent characteristics of a weapon, said attributes having local values that define a local state of each dynamic object;

a plurality of static objects including primitive blocks and common blocks having data that is global with respect to the dynamic objects and functional operators, at least some of which are probabilistic, each common block comprising a plurality of primitive blocks and/or other embedded common blocks configured to process the dynamic objects and global data to route the dynamic objects, modify the dynamic objects or perform a statistical or informational calculation for a defined common block function including each of BIT, Stockpile Availability, Observe $A_O$, Operational Availability, Warranty Check, Set Failure Variates, Service Life Check and Parts Spares;

a network of said primitive and common blocks that are organized in accordance with a service use profile (SUP) that describes a logical structure of delivery, maintenance, deployment and testing policy and infrastructure and logistics constraints to calculate a time-based prediction of stockpile and operational weapons availability, maintenance activities, and spare parts stock over a life cycle of the weapons system, said network having a global state;

a simulation engine that advances to the next change of said local or global states whereat said primitive and common blocks read and write said attributes in accordance with their functional operators and global data and said network updates the time-based predictions as the dynamic objects traverse the network, said DES system displaying the results of the simulation including the time-base prediction of stockpile and operational weapons availability, maintenance activities, and spare parts stock to a user through an interface to maintain an inventory of said weapons over the life cycle of the weapons system.

35. The computer-implemented DES system of claim 34, wherein the MTBF attribute has a plurality of values for different environments.

36. The computer-implemented DES system of claim 34, wherein the value of MTBF attribute increases as the weapons system matures but decrease as individual weapons age.

37. A computer-implemented discrete event simulation (DES) system for the operations and support (O&S) problem of a weapons system, said DES system comprising:

a plurality of dynamic objects having attributes that represent characteristics of weapons, said attributes having local values that define a local state of each dynamic object:

a plurality of static objects including primitive blocks and common blocks having data that is global with respect to the dynamic objects and functional operators, at least some of which are probabilistic, and including a Stockpile Availability common block that calculates a measure $A_s$ of the percentage of weapons in a stockpile that are ready for issue (RFI) as $A_s = RFI/(Nd-Att)$ where Nd is the numbered delivered to the stockpile up to a point in time and Att is the attrition up to a point in time;

a network of said static objects that are organized in accordance with a service use profile (SUP) to calculate a time-based prediction of weapons stockpile availability over a life cycle of the weapons system, said network having a global state; and a simulation engine that advances to the next change of said local or global states whereat said static objects read and write said attributes in accordance with their functional operators and global data and update the time-based prediction of weapons stockpile availability as the dynamic objects traverse the network, said DES system displaying the results of the simulation including the time-base prediction of weapons stockpile availability to a user through an interface to maintain an inventory of said weapons over the life cycle of the weapons system.

38. A computer-implemented discrete event simulation (DES) system for the operations and support (O&S) problem of a weapons system, said DES system comprising:

a plurality of dynamic objects having attributes that represent characteristics of weapons including MTBF, Time-to-Failure (TTF) and BitDetectable attributes, said attributes having local values that define a local state of each dynamic object;

a plurality of static objects including primitive blocks and common blocks having data that is global with respect to the dynamic objects and functional operators, at least some of which are probabilistic, and including a Set Failure Variates common block that uses the MTBF as an input to randomly generate a value for the TTF attribute and randomly generates either a 0 or 1 for the BitDectable attributes based on an overall test effectiveness probability;

a network of said static objects that are organized in accordance with a service use profile (SUP) to cateulate a time-based prediction of weapons availability over a life cycle of the weapons system, said network having a global state: and a simulation engine that advances to the next change of said local or global states whereat said static objects read and write said attributes in accordance with their functional operators and global data and update the time-based prediction of weapons availability as the dynamic objects traverse the network, said DES system displaying the results of the simulation including the time-base prediction of weapons availability to a user through an interface to maintain an inventory of said weapons over the life cycle of the weapons system.

39. A computer-implemented discrete event simulation (DES) system for the operations and support (O&S) problem of a weapons system, said DES system comprising:

a plurality of dynamic objects having attributes that represent characteristics of weapons including Birth Date, MTBF, and TTF attributes, said attributes having local values that define a local state of each dynamic object;

a plurality of static objects including primitive blocks and common blocks having data that is global with respect to the dynamic objects and functional operators, at least some of which are probabilistic, and including a Service Life Check common block that uses the Birth Data and CurrentTime attributes to calculate the age of the dynamic object and compare it to a service life, and if the age is greater than the service life either take the dynamic object out of service or recalculate its MTBF and TTF attributes as a function of its age a network of said static objects that are organized in accordance with a service use profile (SUP) to calculate a time-based prediction of weapons availability over a life cycle of the weapons system, said network having a global state; and a simulation engine that advances to the next change of said local or global states whereat said static objects read and write said attributes in accordance with their functional operators and global data and update the time-based prediction of weapons availability as the dynamic objects traverse the network,said DES system displaying the results of the simulation including the time-base prediction of weapons availability to a user through an interface to maintain an inventory of said weapons over the life cycle of the weapons system.

40. A computer-implemented discrete event simulation (DES) system for the operations and support (Q&S) problem of a weapons system, said DES system comprising:

a plurality of dynamic objects having attributes that represent characteristics of weapons including Birth Date and Down Time attributes, said attributes having local values that define a local state of each dynamic object:

a plurality of static objects including primitive blocks and common blocks having data that is global with respect to the dynamic objects and functional operators, at least some of which are probabilistic, and including an Observe $A_O$ common block calculating a single point estimate $A_0S$ of $A_O$ as $A_0S=1$ −Down Time/(CurrentTime−Birth Date) where CurrentTime is a current time and a count of the number of observations to date and an Operational Availability common block that calculates a running average $A_0$ from a plurality of single-point estimates $A_0S$ observed at different points in the network weighted by a cumulative number of observations for each estimate;

a network of said static objects that are organized in accordance with a service use profile (SUP) to calculate a time-based prediction of weapons operational availability over a life cycle of the weapons system, said network having a global state; and a simulation engine that advances to the next change of said local or global states whereat said static objects read and write said attributes in accordance with their functional operators and global data and update the time-based prediction of weapons operational availability as the dynamic objects traverse the network, said DES system displaying the results of the simulation including the time-base prediction of weapons operational availability to a user through an interface to maintain an inventory of said weapons over the life cycle of the weapons system.

41. A computer-implemented discrete event simulation (DES) system for the operations and support (O&S) problem of a weapons system, said DES system comprising:

a plurality of dynamic objects having attributes that represent characteristics of weapons including TTF, Duty Cycle and BitDetectable attributes, said attributes having local values that define a local state of each dynamic object;

a plurality of static objects including primitive blocks and common blocks having data that is global with respect to the dynamic objects and functional operators, at least some of which are probabilistic, and including a BIT common block performing a sequence of logical operations on the dynamic object to determine whether a false alarm failure occurs, whether a failure is detectable by the value of the BitDetectable attribute and whether the dynamic object's Duty Cycle is greater or less than its TTF;

a network of said static objects that are organized in accordance with a service use profile (SUP) to calculate a time-based prediction of weapons availability over a life cycle of the weapons system, said network having a global state: and a simulation engine that advances to the next change of said local or global states whereat said static objects read and write said attributes in accordance with their functional operators and global data and update the time-based prediction of weapons availability as the dynamic objects traverse the network, said DES system displaying the results of the simulation including the time-base prediction of weapons availability to a user through an interface to maintain an inventory of said weapons over the life cycle of the weapons system.

42. The computer-implement DES system of claim 34, wherein said dynamic objects have a plurality of failure modes that require different parts spares, said Parts Spares block calculating a time delay for a failed dynamic object by calculating a random fault isolation delay, calculating the maximum replenishment delay for the multiple failure modes and calculating a random removal and replacement delay.

43. A method of analyzing an operations and support (O&S) problem of a weapons system, comprising:

creating a model of the O&S problem based on a service use profile (SUP) that describes a logical structure of delivery, maintenance, deployment and testing policy and infrastructure and logistics constraints;

translating the model into a discrete event simulation in which dynamic objects flow through a network of static objects that are organized in accordance with the model, said dynamic objects having common attributes with local values and said static objects having data that is global with respect to the dynamic objects and functional operators at least some of which are probabilistic;

executing the discrete event simulation by advancing to a next state whereat said static objects read and write said common attributes in accordance with their functional operators and global data and said simulation updates a time-based prediction of weapons stockpile and operational availability, maintenance activities, and spare parts stock over a life cycle of the weapons system;

displaying the results of the simulation including the time-base prediction of weapons stockpile and operational availability, maintenance activities, and spare parts stock to a user through an interface to maintain an inventory of said weapons over the life cycle of the weapons system.

44. The method of claim 43, wherein said common attributes include a plurality selected from Birth Date, Time-to-Failure (TTF) variate, Duty Cycle, Warranty Cycle, Down Time, MTBF, BitDetectable, GodsEye and Weapon Variant common attributes.

45. The method of claim 44, wherein the MTBF attribute has a plurality of values for different environments.

46. The method of claim 44, wherein the value of MTBF attribute increases as the weapons system matures but decrease as individual weapons age.

47. The method of claim 43, wherein the plurality of the static objects comprise primitive blocks and common blocks, said common blocks including Set Failure Variates and BIT and at least one of Stockpile Availability, Observe $A_0$ and Operational Availability, Warranty Check, Service Life Check and Parts Spares, said dynamic objects having common attributes including at least Duty Cycle, TTF variate, BitDetectable and MTBF.

48. A computer-implemented discrete event simulation (DES) system for the operations and support (O&S) problem of a Exoatmospheric Kill Vehicles (EKV) program, said DES system comprising:

a plurality of dynamic objects having attributes that represent characteristics of EKVS, said attributes having local values that define a local state of each dynamic object;

a plurality of static objects having data that is global with respect to the dynamic objects and functional operators, at least some of which are probabilistic;

a network of said static objects that are organized in three hierarchical blocks Delivery, Repair & Deployment; Silo Storage and Periodic Test; and Maintenance Returns in accordance with a service use profile (SUP) to calculate a time-based prediction of weapons availability over a life cycle of the EKV program to (1) decide between two competing maintenance concepts A and B for the program; (2) quantify repairs of EKV payloads; and (3) identify major spares requirements for EKV payloads return, said network having a global state: and a simulation engine that advances to the next change of said local or global states whereat said static objects read and write said attributes in accordance with their functional operators and global data and update the time-based prediction of weapons availability as the dynamic objects traverse the network, said DES displaying the results of the simulation including the time-base prediction of weapons availability, maintenance activities and spare parts stock to a user through an interface to maintain an inventory of said weapons over the life cycle of the weapons system.

49. The computer-implemented (DES) system of claim 48, wherein said common attributes include a plurality selected from Birth Date, Time-to-Failure (TTF) variate, Duty Cycle, Warranty Cycle, Down Time, MTBF, BitDetectable, GodsEye and Weapon Variant common attributes.

50. The computer-implemented (DES) system of claim 49, wherein the MTBF attribute has a plurality of values for different environments.

51. The computer-implemented (DES) system of claim 49, wherein the value of MTBF attribute increases as the weapons system matures but decrease as individual weapons age.

52. The computer-implemented (DES) system of claim 49, wherein the static objects comprise a plurality of primitive blocks and a plurality of common blocks, each common block comprising a plurality of primitive blocks and/or other embedded common blocks configured to process the dynamic objects and global data to route the dynamic objects, modify the dynamic objects or perform a statistical or informational calculation for a defined block function to support the calculation of the time-based prediction.

53. The computer-implemented (DES) system of claim 52, wherein the plurality of common blocks include Set Failure Variates and BIT and at least one of, Stockpile Availability, Observe $A_O$ and Operational Availability, Warranty Check, Set Failure Variates, Service Life Check and Parts Spares.

54. The computer-implemented (DES) system of claim 1, wherein the time-base prediction of weapons availability, maintenance activities and spare parts stock is used to (1) decide between two competing maintenance concepts A and B for the weapons system; (2) quantify repairs of the weapons; and (3) identify major spares requirements for the weapons.

55. The method of claim 43, wherein the time-base prediction of weapons availability, maintenance activities and spare parts stock is used to (1) decide between two competing maintenance concepts A and B for the weapons system; (2) quantify repairs of the weapons; and (3) identify major spares requirements for the weapons.

56. The method of claim 43, wherein the static objects comprise a plurality of primitive blocks and a plurality of common blocks that are organized in accordance with the SUP, further comprising:

Providing a library of common blocks including BIT, Stockpile Availability, Observe $A_O$, Operational Availability, Warranty Check, Set Failure Variates, Service Life Check and Parts Spares, wherein said network includes at least one said common block to support the calculation of the time-based predictions.

57. The method of claim 47, wherein said Set Failure Variates block uses the MTBF as an input to randomly generate a value for the TTF attribute and randomly generating either a 0 or 1 for the BitDetectable attributes based on an overall test effectiveness probability.

58. The method of claim 47, wherein said BIT block performs a sequence of logical operations on the dynamic object to determine whether a false alarm failure occurs, whether a failure is detectable by the value of the BitDetectable attribute and whether the dynamic object's Duty Cycle is greater or less than its TTF.

59. The method of claim 47, wherein the included Stockpile Availability block calculates a measure $A_s$ of the percentage of weapons in a stockpile that are ready for issue (RFI) as $A_s$=RFI (Nd−Att) where Nd is the numbered delivered to the stockpile up to a point in time and Att is the attrition up to a point in time.

60. The method of claim 47, wherein said dynamic objects includes Birth Date attributes, said included Service Life Check block using the Birth Data and CurrentTime attributes to calculate the age of the dynamic object and compare it to a service life, and if the age is greater than the service life either take the dynamic object out of service or recalculate its MTBF and TTF attributes as a function of its age.

61. The method of claim 47, wherein said dynamic objects include Birth Date and Down Time attributes, said included Observe $A_O$ block calculating a single point estimate $A_0S$ of $A_O$ as $A_0S$=1−Down Time/(CurrentTime−Birth Date) where CurrentTime is a current time and a count of the number of observations to date and said included Operational Availability block calculating a running average $A_0$ from a plurality of single-point estimates $A_0s$ observed at different points in the network weighted by a cumulative number of observations for each estimate.

* * * * *

UNITED STATES PATENT AND TRADEMARK OFFICE
CERTIFICATE OF CORRECTION

PATENT NO.         : 7,315,805 B2
APPLICATION NO. : 10/772592
DATED                  : January 1, 2008
INVENTOR(S)        : Slater It is certified that error appears in the above-identified patent and that said Letters Patent is hereby corrected as shown below:

In the title, delete "STIMULATION" and replace with --SIMULATION--;

In column 28, line 13, claim 6 delete "Birth Date TTF" and replace with --Birth Date, TTF--;

In column 28, lines 47-48, claim 12, delete "corresponding different" and replace with --corresponding to different--;

In column 28, line 57, claim 14, delete "Cheek" and replace with --Check--;

In column 30, lines 7-8, claim 29, delete "a the BIT common" and replace with --the BIT common block--;

In column 30, lines 23-24, claim 30, delete "$A_0$ S" and replace with --$A_0S$--;

In column 30, line 41, claim 32, delete "Warranty cycle" and replace with --Warranty Cycle--.

In column 32, line 13, claim 38, delete "BitDectable" and replace with --BitDetectable--;

In column 32, line 16, claim 38, delete "cateulate" and replace with --calculate--;

In column 32, line 47, claim 39, delete "function of its age" and replace with --function of its age;--;

In column 32, line 58, claim 39, delete ",said" and replace with --, said--;

In column 33, line 55, claim 41, delete "a global state: and" and replace with --a global state; and--;

In column 33, line 66, claim 42, delete "The computer-implement DES" and replace with --The computer-implemented DES--;

In column 34, line 29, claim 43, delete "time-base prediction" and replace with --time-based prediction--;

UNITED STATES PATENT AND TRADEMARK OFFICE
CERTIFICATE OF CORRECTION

PATENT NO.         : 7,315,805 B2
APPLICATION NO. : 10/772592
DATED              : January 1, 2008
INVENTOR(S)       : Slater It is certified that error appears in the above-identified patent and that said Letters Patent is hereby corrected as shown below:

In column 34, lines 42-43, claim 46, delete "but decrease as" and replace with --but decreases as--;

In column 34, line 48, claim 47, delete "$A_0$ and operational" and replace with --$A_0$, and Operational--;

In column 35, lines 5-6, claim 48, delete "a global state: and" and replace with --a global state; and--;

In column 35, line 14, claim 48, delete "time-base prediction" and replace with --time-based prediction--;

In column 35, line 28, claim 51, delete "but decrease as" and replace with --but decreases as--;

In column 35, line 42, claim 53, delete "$A_0$ and operational" and replace with --$A_0$, and Operational--;

In column 35, line 46, claim 54, delete "time-base prediction" and replace with --time-based prediction--;

In column 35, lines 52-53, claim 55, delete "time-base prediction" and replace with --time-based prediction--;

In column 36, lines 31-32, claim 59, delete "numbered delivered" and replace with --number delivered--.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,315,805 B2 | Page 1 of 2 |
| APPLICATION NO. | : 10/772592 | |
| DATED | : January 1, 2008 | |
| INVENTOR(S) | : Slater | |

It is certified that error appears in the above-identified patent and that said Letters Patent is hereby corrected as shown below:

In the title Item [54] and Column 1, line 2, delete "STIMULATION" and replace with --SIMULATION--;

In column 28, line 13, claim 6 delete "Birth Date TTF" and replace with --Birth Date, TTF--;

In column 28, lines 47-48, claim 12, delete "corresponding different" and replace with --corresponding to different--;

In column 28, line 57, claim 14, delete "Cheek" and replace with --Check--;

In column 30, lines 7-8, claim 29, delete "a the BIT common" and replace with --the BIT common block--;

In column 30, lines 23-24, claim 30, delete "$A_0$ S" and replace with --$A_0S$--;

In column 30, line 41, claim 32, delete "Warranty cycle" and replace with --Warranty Cycle--;

In column 32, line 13, claim 38, delete "BitDectable" and replace with --BitDetectable--;

In column 32, line 16, claim 38, delete "cateulate" and replace with --calculate--;

In column 32, line 47, claim 39, delete "function of its age" and replace with --function of its age;--;

In column 32, line 58, claim 39, delete ",said" and replace with --, said--;

In column 33, line 55, claim 41, delete "a global state: and" and replace with --a global state; and--;

In column 33, line 66, claim 42, delete "The computer-implement DES" and replace with --The computer-implemented DES--;

In column 34, line 29, claim 43, delete "time-base prediction" and replace with --time-based prediction--;

In column 34, lines 42-43, claim 46, delete "but decrease as" and replace with --but decreases as--;

UNITED STATES PATENT AND TRADEMARK OFFICE
CERTIFICATE OF CORRECTION

PATENT NO. : 7,315,805 B2
APPLICATION NO. : 10/772592
DATED : January 1, 2008
INVENTOR(S) : Slater It is certified that error appears in the above-identified patent and that said Letters Patent is hereby corrected as shown below:

In column 34, line 48, claim 47, delete "$A_0$ and operational" and replace with --$A_0$, and Operational--;

In column 35, lines 5-6, claim 48, delete "a global state: and" and replace with --a global state; and--;

In column 35, line 14, claim 48, delete "time-base prediction" and replace with --time-based prediction--;

In column 35, line 28, claim 51, delete "but decrease as" and replace with --but decreases as--;

In column 35, line 42, claim 53, delete "$A_0$ and operational" and replace with --$A_0$, and Operational--;

In column 35, line 46, claim 54, delete "time-base prediction" and replace with --time-based prediction--;

In column 35, lines 52-53, claim 55, delete "time-base prediction" and replace with --time-based prediction--;

In column 36, lines 31-32, claim 59, delete "numbered delivered" and replace with --number delivered--.

This certificate supersedes the Certificate of Correction issued July 1, 2008.

Signed and Sealed this

Twenty-second Day of July, 2008

JON W. DUDAS
*Director of the United States Patent and Trademark Office*